(12) United States Patent
Russell et al.

(10) Patent No.: US 9,996,167 B2
(45) Date of Patent: Jun. 12, 2018

(54) DYNAMIC RFID-BASED INPUT DEVICES

(71) Applicant: Amazon Technologies, Inc., Seattle, WA (US)

(72) Inventors: Ryan Scott Russell, Bellevue, WA (US); Wesley Scott Lauka, Seattle, WA (US); Fransisca Vina Zerlina, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 14/524,638

(22) Filed: Oct. 27, 2014

(65) Prior Publication Data

US 2016/0116976 A1    Apr. 28, 2016

(51) Int. Cl.
*G06F 3/02* (2006.01)
*G06Q 10/00* (2012.01)
*G06K 7/00* (2006.01)
*G06K 19/00* (2006.01)

(52) U.S. Cl.
CPC .............. *G06F 3/0202* (2013.01); *G06K 7/00* (2013.01); *G06K 19/00* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 5,099,977 A | 3/1992 | Hirose et al. | |
| 6,366,242 B1 | 4/2002 | Boyd et al. | |
| 6,531,964 B1 | 3/2003 | Loving | |
| 6,825,751 B1 | 11/2004 | Kita et al. | |
| 7,336,174 B1 | 2/2008 | Maloney | |
| 7,385,479 B1 | 6/2008 | Green et al. | |
| 8,169,303 B2 | 5/2012 | Hanebeck | |
| 8,482,412 B2 | 7/2013 | Majoros et al. | |
| 8,542,834 B1 | 9/2013 | Feikis et al. | |

(Continued)

FOREIGN PATENT DOCUMENTS

| | | |
|---|---|---|
| JP | 2000286761 A | 10/2000 |
| JP | 2006165892 A | 6/2006 |

(Continued)

OTHER PUBLICATIONS

International Search Report and Written Opinion of PCT Application No. PCT/US2015/037287 with a mailing date of Sep. 30, 2015.

(Continued)

*Primary Examiner* — Firmin Backer
*Assistant Examiner* — Shawna M Kingston
(74) *Attorney, Agent, or Firm* — Athorus, PLLC

(57) ABSTRACT

A dynamic RFID-based input device may include an input surface and an input station. The input surface may include a plurality of RFID transmitting devices provided on at least one flexible layer, and the input station may include one or more RFID receiving devices, e.g., antennas and/or readers, provided in communication with a computing system or network. A worker may contact one or more portions of the input surface, and thereby cause one or more of the RFID transmitting devices to transmit one or more RFID signals including information, data, commands or instructions to be provided to the RFID receiving devices. Audible, visible or haptic feedback may be provided to the worker in response to the transmission of the one or more RFID signals.

22 Claims, 11 Drawing Sheets

(56) References Cited

U.S. PATENT DOCUMENTS

| | | |
|---|---|---|
| 8,556,178 B2 | 10/2013 | Wang et al. |
| 8,893,969 B2 | 11/2014 | Brandl |
| 9,405,948 B2 | 8/2016 | Schwiers et al. |
| 2002/0067264 A1 | 6/2002 | Soehnlen |
| 2002/0185542 A1 | 12/2002 | Wilz et al. |
| 2003/0075608 A1 | 4/2003 | Atherton |
| 2003/0136635 A1 | 7/2003 | Lauch |
| 2003/0189493 A1 | 10/2003 | Klausner et al. |
| 2004/0066296 A1 | 4/2004 | Atherton |
| 2004/0118916 A1 | 6/2004 | He |
| 2004/0119605 A1 | 6/2004 | Schaper |
| 2005/0149226 A1 | 7/2005 | Stevens et al. |
| 2005/0183990 A1 | 8/2005 | Corbett |
| 2005/0200476 A1 | 9/2005 | Forr et al. |
| 2005/0203798 A1 | 9/2005 | Jensen et al. |
| 2005/0219050 A1 | 10/2005 | Martin |
| 2005/0234774 A1 | 10/2005 | Dupree |
| 2005/0243784 A1 | 11/2005 | Fitzgerald et al. |
| 2005/0284941 A1 | 12/2005 | Lubow |
| 2006/0044110 A1 | 3/2006 | Napolitano |
| 2006/0119481 A1 | 6/2006 | Tethrake et al. |
| 2006/0145880 A1 | 7/2006 | Chi et al. |
| 2006/0186201 A1 | 8/2006 | Hart |
| 2006/0187061 A1 | 8/2006 | Colby |
| 2006/0244593 A1 | 11/2006 | Nycz et al. |
| 2006/0284839 A1 | 12/2006 | Breed et al. |
| 2007/0018832 A1 | 1/2007 | Beigel et al. |
| 2007/0021197 A1 | 1/2007 | Frerking |
| 2007/0030151 A1 | 2/2007 | Morrow |
| 2007/0057469 A1 | 3/2007 | Grauzer et al. |
| 2007/0075148 A1 | 4/2007 | Usami |
| 2007/0075861 A1 | 4/2007 | Cook et al. |
| 2007/0083283 A1 | 4/2007 | Ara et al. |
| 2007/0096906 A1 | 5/2007 | Lyons et al. |
| 2007/0100677 A1 | 5/2007 | Boss et al. |
| 2007/0109101 A1 | 5/2007 | Colby |
| 2007/0126578 A1 | 6/2007 | Broussard |
| 2007/0136218 A1 | 6/2007 | Bauer et al. |
| 2007/0152829 A1 | 7/2007 | Lindsay et al. |
| 2007/0164863 A1 | 7/2007 | Himberger et al. |
| 2007/0175972 A1 | 8/2007 | Ringer |
| 2007/0296599 A1 | 12/2007 | Wang et al. |
| 2008/0093176 A1 | 4/2008 | Rosenthal |
| 2008/0113767 A1 | 5/2008 | Nguyen et al. |
| 2008/0185265 A1 | 8/2008 | Alemany et al. |
| 2008/0297324 A1 | 12/2008 | Tuttle |
| 2009/0033463 A1 | 2/2009 | Posamentier |
| 2009/0085721 A1 | 4/2009 | Dishongh |
| 2009/0167699 A1 | 7/2009 | Rosenblatt et al. |
| 2009/0309086 A1 | 12/2009 | Behan et al. |
| 2010/0063652 A1 | 3/2010 | Anderson |
| 2010/0097195 A1 | 4/2010 | Majoros et al. |
| 2010/0114426 A1 | 5/2010 | Boss et al. |
| 2010/0123581 A1 | 5/2010 | Hatfield et al. |
| 2010/0171592 A1 | 7/2010 | Kamemaru |
| 2010/0177993 A1 | 7/2010 | Chen |
| 2010/0271187 A1 | 10/2010 | Uysal et al. |
| 2010/0308964 A1 | 12/2010 | Ackley et al. |
| 2010/0308975 A1 | 12/2010 | Gregersen et al. |
| 2010/0312606 A1 | 12/2010 | Gala |
| 2011/0163850 A1 | 7/2011 | Bachman et al. |
| 2011/0227748 A1 | 9/2011 | Schaible et al. |
| 2011/0266342 A1 | 11/2011 | Forster |
| 2011/0285507 A1 | 11/2011 | Nelson |
| 2012/0299703 A1 | 11/2012 | Chen |
| 2013/0027191 A1 | 1/2013 | Wilkinson |
| 2013/0218511 A1 | 8/2013 | Mager et al. |
| 2013/0314207 A1 | 11/2013 | Yonekura et al. |
| 2013/0342349 A1 | 12/2013 | Cruz |
| 2014/0002113 A1 | 1/2014 | Schediwy et al. |
| 2014/0012161 A1 | 1/2014 | Ross |
| 2014/0061303 A1 | 3/2014 | Brandl |
| 2014/0061382 A1 | 3/2014 | Tucker |
| 2014/0111333 A1 | 4/2014 | Haas |
| 2014/0121903 A1 | 5/2014 | Lee |
| 2014/0148988 A1 | 5/2014 | Lathrop et al. |
| 2014/0176307 A1 | 6/2014 | Forster |
| 2014/0186219 A1 | 7/2014 | Yukimoto |
| 2014/0232519 A1 | 8/2014 | Allen et al. |
| 2015/0357948 A1 | 12/2015 | Goldstein |
| 2015/0360567 A1 | 12/2015 | Sannomiya et al. |

FOREIGN PATENT DOCUMENTS

| | | |
|---|---|---|
| JP | 2007286965 A | 11/2007 |
| JP | 2011529721 A | 12/2011 |
| WO | 2010014331 A1 | 2/2010 |
| WO | 2014093968 A1 | 6/2014 |

OTHER PUBLICATIONS

International Search Report and Written Opinion of PCT Application No. PCT/US2015/056779 with a mailing date of Jan. 19, 2016.
Sample, A.P "A Capacitive Touch Interface for Passive RFID tags", 2009 IEEE International Conference on RFID, pp. 103-109.
International Search Report for International Application No. PCT 2015/037531 mailed Sep. 25, 2015.
Office Action for Japanese Patent Application No. 2016-570836 dated Aug. 28, 2017.

US 9,996,167 B2

DYNAMIC RFID-BASED INPUT DEVICES

BACKGROUND

Workers in industrial and commercial environments commonly use computers and computer devices to perform any number of tasks, or to execute any number of functions. For example, workers may use a computer to identify or authenticate themselves, to access information (e.g., instructions or data) or to report or confirm their performance of one or more actions or activities. In order to operate a computer, workers typically manipulate an input device such as a keyboard or a mouse. Such input devices may be used to provide information, to enter commands, to select or manipulate one or more interactive elements, or to otherwise execute any relevant function.

Typically, input devices may include a variety of standard, fixed features that are configured for use in any number of applications that may operate on the computers with which the devices are associated. For example, most computer keyboards in the United States include keys corresponding to letters, numbers and symbols arranged in a standard QWERTY layout with specific locations that cannot be modified, while most mouses or other pointing devices are provided with a standard number (e.g., one, two or three) of buttons in addition to navigational elements such as balls or wheels.

Because most input devices are of a general "one-size-fits-all" nature, however, the input devices may not be customized for use by a particular user or for a specific application. Users of a word processing application, a spreadsheet application and a web browser operating on a single computer, for example, must typically use the same mouse or pointing device to select interactive features and use the same keyboard to enter information or data on each of the different applications despite their unique functions and purposes. Furthermore, providing commands or instructions to a computer using such an input device typically requires a user to enter a number of alphanumeric characters in combination with one or more special-purpose keys (e.g., function keys). Moreover, input devices typically must feature their own onboard power supplies (e.g., batteries), or be tethered to one or more power supplies by hard-wired means.

Computer input devices are also typically unable to identify or discern an identity of a user who uses such devices in operation. Therefore, if the user has one or more preferences for operating a computer or an application running thereon, he or she must manually enter or select such preferences, or configure the computer or application according to such preferences, using an input device. Additionally, while in many applications, a user of a computer must authenticate himself or herself or otherwise establish his or her qualifications by entering a user name, a password, a passcode, a personal identification number (or "PIN") or another authenticating code through an input device, the input device itself operates in the same manner regardless of who is actually controlling its operation. Thus, if another person obtains the user's authenticating code, perhaps by surreptitious means, that other person may input the code into the computer and execute one or more actions or enter one or more instructions on behalf of the user, and the input device will interpret such actions or instructions as if the actions or instructions had been provided by the user.

DETAILED DESCRIPTION

As is set forth in greater detail below, the present disclosure is directed to the use of dynamic input controllers including one or more radio frequency identification (or "RFID") devices in communication with computers or computer-based systems. More specifically, the systems and methods disclosed herein are directed to the use of portable input surfaces in the vicinity of input stations, wherein the input surfaces feature one or more manually activated RFID transmitting devices (e.g., tags) provided therein, and the input stations having one or more RFID reading systems or receiving devices (e.g., antennas and/or readers) with static or dynamic transmitting elements containing volatile or non-volatile memory components.

In accordance with the present disclosure, portable input surfaces may be formed from substantially thin materials in a single layer or in multiple layers, and may include manually activated RFID tags as well as other non-manually activated, or automatic, RFID tags (e.g., passive RFID tags) and/or other feedback devices provided thereon. The number, type and purpose of the manually activated RFID tags provided in the portable input surfaces may be selected and/or customized on any basis, including but not limited to the preferences, qualifications or permissions of a user of a portable input surface or the purpose or application for which the portable input surface is provided. The input stations may include one or more RFID reading systems, along with one or more feedback devices (e.g., audio speakers, video displays or monitors, or haptic vibrating elements), and may be connected to one or more computer systems via wired or wireless means. The RFID antennas may be provided within the input stations, or within a vicinity of the input stations, in any manner, such as by embedding one or more of the RFID antennas into one or more components of the input stations (such as a working surface), or by suspending the RFID antennas above or in close proximity to such components, within an expected range of one or more users of the portable input surfaces. Information, data, commands or instructions may be transmitted from the portable input surfaces to the input stations in the form of RFID signals, either independently or simultaneously, and the input stations may interpret such signals and cause one or more instructions to be provided to computer systems, or actions to be executed by such computer systems, on behalf of the users.

Figure 1A:
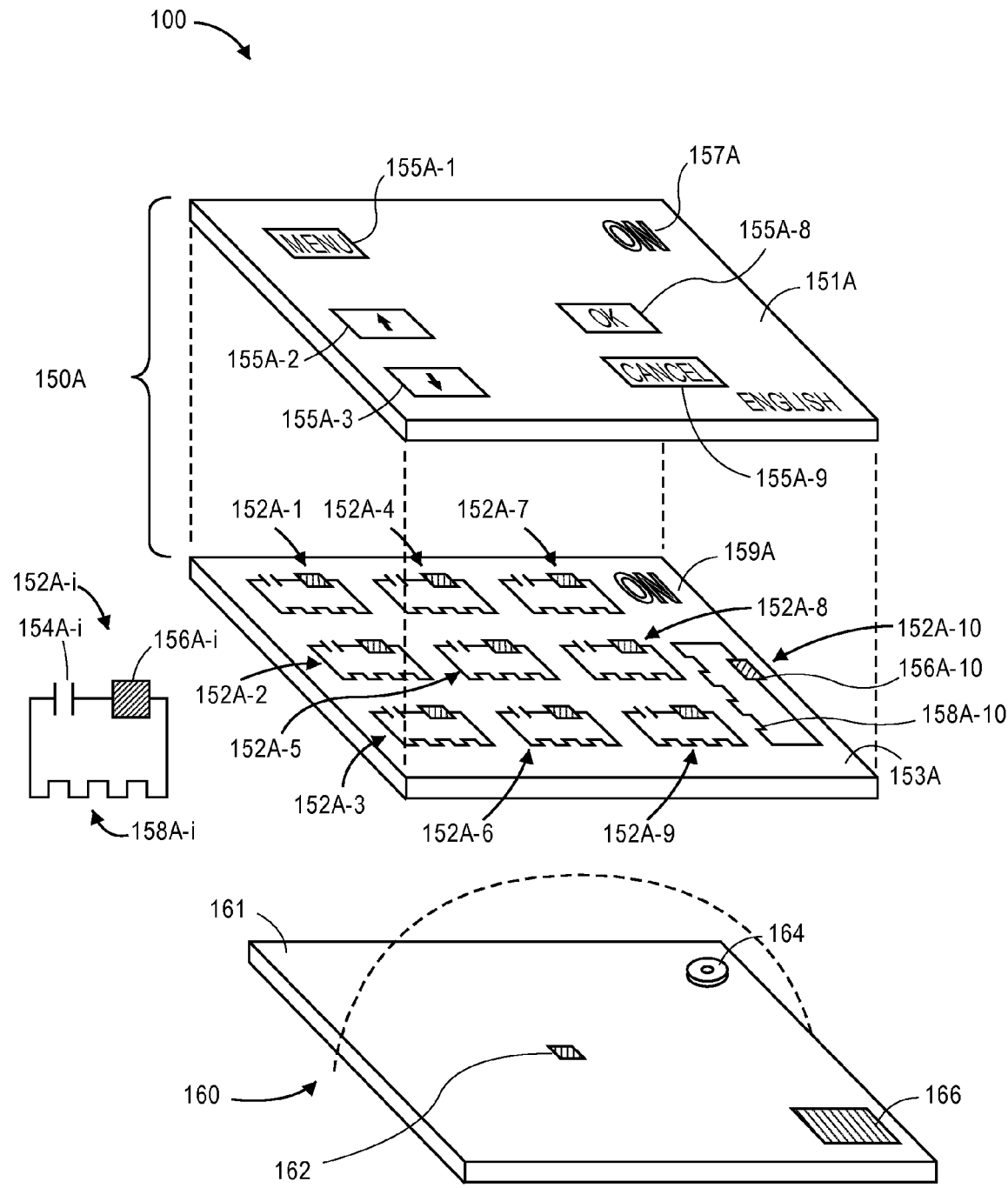
FIGS. 1A through 1D are views of components of one system including a dynamic RFID-based input device in accordance with embodiments of the present disclosure.

Referring to FIGS. 1A through 1D, a system 100 including dynamic RFID-based input devices is shown. As is shown in FIG. 1A, the system 100 includes an input surface 150A and an input station 160. The input surface 150A includes a top layer 151A and a bottom layer 153A. Sandwiched between the top layer 151A and the bottom layer 153A, a plurality of manually activated RFID devices 152A-1, 152A-2, 152A-3, 152A-4, 152A-5, 152A-6, 152A-7, 152A-8, 152A-9 and an automatic RFID device 152A-10 are adhered to the bottom layer 153A. As is also shown in FIG. 1A, each of the manually activated RFID devices 152A-i includes a gap or a break 154A-i in series with a microchip or other memory component 156A-i and an antenna 158A-i, with the gap or break 154A-i aligned to be closed upon contact with a corresponding contact point, thereby causing information stored in the memory component 156A-i to be transmitted to a nearby RFID receiving device by way of the antenna 158A-i. Moreover, the automatic RFID device 152A-10 further includes a microchip or other memory component 156A-10 and an antenna 158A-10, and is configured to automatically transmit information stored in the memory component 156A-10 when the antenna 158A-10 is within range of an RFID receiving device, without requiring any contact to be made with a corresponding portion of the top layer 151A.

Additionally, the top layer 151A includes a plurality of contact points 155A-1, 155A-2, 155A-3, 155A-8, 155A-9 and a partially transparent layer 157A comprising the letters "ON." Similarly, the bottom layer 153A also includes a perforation 159A comprising the layers "ON." The top layer 151A and the bottom layer 153A of the input surface 150A are aligned such that each of the contact points 155A-1, 155A-2, 155A-3, 155A-8, 155A-9 is provided above a corresponding manually activated RFID device 152A-1, 152A-2, 152A-3, 152A-8, 152A-9, and the partially transparent layer 157A is provided above the perforation 159A. The RFID devices 152A-4, 152A-5, 152A-6, 152A-7 do not have a corresponding contact point associated therewith, and are therefore inactive.

The input station 160 comprises an easel or other working surface 161 having an RFID antenna 162 provided substantially centrally thereon, as well as a light emitting diode ("LED") illuminator 164 and an audio speaker 166. The illuminator 164 and the audio speaker 166 may be functionally joined with the RFID antenna 162 and configured to project light or sounds when one or more of the RFID antennas senses an RFID device within a predetermined range. Additionally, the input station 160 is configured such that when the input surface 150A is placed upon the easel 161, the RFID devices 152A-1, 152A-2, 152A-3, 152A-4, 152A-5, 152A-6, 152A-7, 152A-8, 152A-9, 152A-10 will be provided in close proximity to the RFID antenna 162, e.g., within an operating range of the RFID antenna 162, such that the RFID antenna 162 may receive any RFID signals transmitted by one or more of the RFID devices 152A-1, 152A-2, 152A-3, 152A-8, 152A-9 upon contact with one or more of the contact points 155A-1, 155A-2, 155A-3, 155A-8, 155A-9. Likewise, when the input surface 150A is placed upon the easel 161, the partially transparent layer 157A and the perforation 159A will be disposed above the illuminator 164, such that light projected by the illuminator will pass through the perforation 159A to the partially transparent layer 157A, and be visible to one or more users thereof.

Figure 1B:
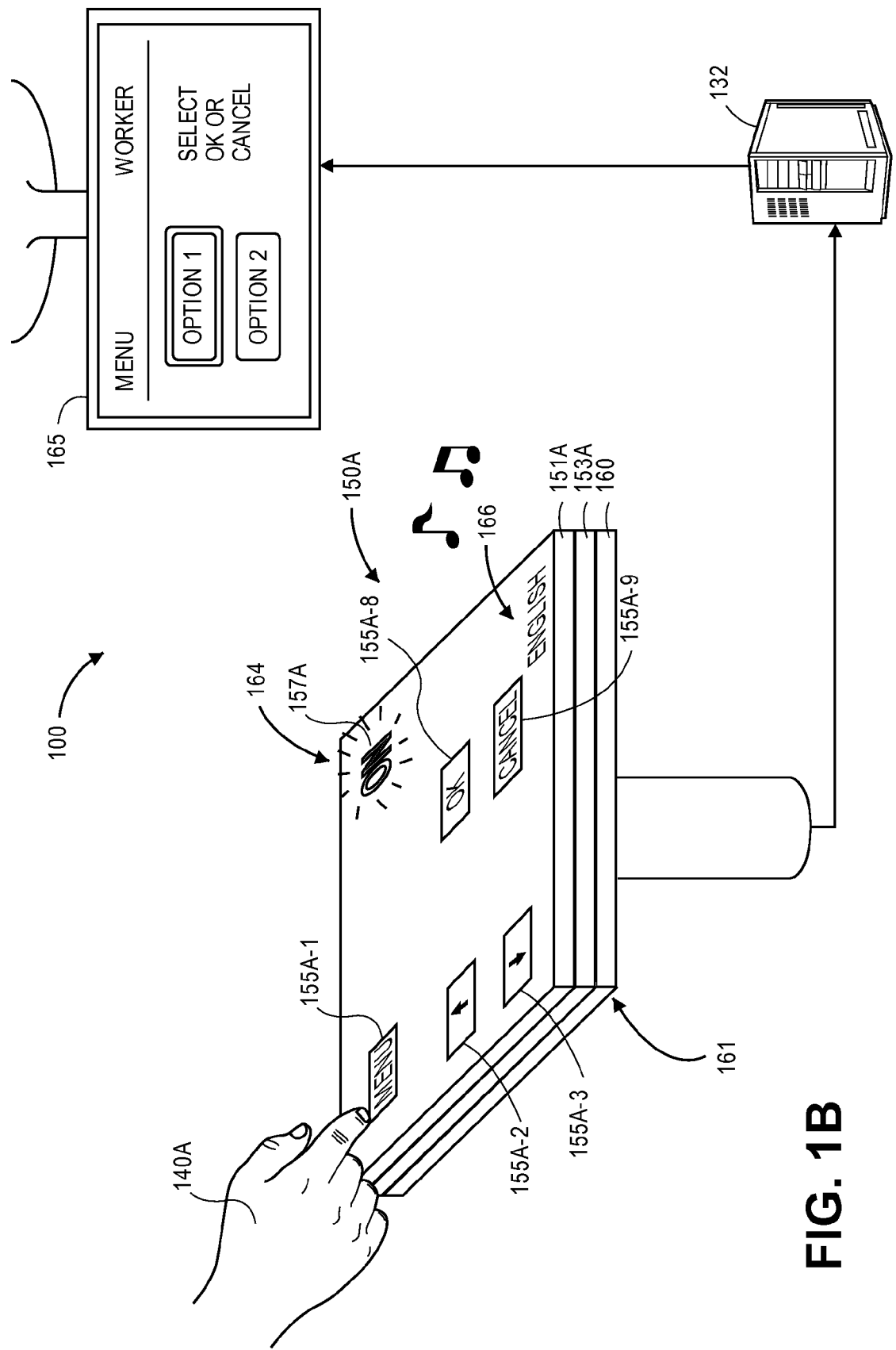

In accordance with the present disclosure, input surfaces having a plurality of manually activated RFID tags, such as the input surface 150A of FIG. 1A, may be provided in a vicinity of input stations having one or more associated RFID antennas, such as the input station 160 of FIG. 1A, and used to wirelessly transmit information, data, commands or instructions in a contact-free manner. Referring to FIG. 1B, the system 100 further includes a server 132 in communication with the input station 160 and the RFID antenna 162 (not shown), and a display monitor 165 associated with the server 132. The system 100 shown in FIG. 1B includes the input surface 150A placed upon the easel 161 of the input station 160.

As is shown in FIG. 1B, when the input surface 150A is placed upon the input station 160, the illuminator 164 may be lit, thereby causing light to pass through the perforation 159A (not shown) and the partially transparent layer 157A, and providing an indication that the input surface 150A may receive contact from a user 140A. Subsequently, when the user 140A contacts one or more of the contact points 155A-1, 155A-2, 155A-3, 155A-8, 155A-9 on the top layer 151A, one or more RFID signals are transmitted from the corresponding RFID devices 152A-1, 152A-2, 152A-3, 152A-8, 152A-9 to the RFID antenna 162, and such signals may comprise one or more instructions or cause the server 132 to perform one or more actions. As is also shown in FIG. 1B, information or data including a menu for entering instructions or executing actions on behalf of the user 140A may be expressed on the display monitor 165.

Moreover, contact with one or more of the contact points 155A-1, 155A-2, 155A-3, 155A-8, 155A-9 by the user 140A which energizes a corresponding one or more of the corresponding RFID devices 152A-1, 152A-2, 152A-3, 152A-8, 152A-9 may further cause the input station 160 and/or the server 132 to provide feedback to the user 140A, such as the playing of tones, music or other sounds from the audio speaker 166. Alternatively, feedback may be provided by one or more haptic vibrating systems (not shown) in one or more locations within the input station 160 and/or on the easel 161, which may generate a vibrating signal upon contact with one or more of the contact points 155A-1, 155A-2, 155A-3, 155A-8, 155A-9 by the user 140A, or in response to RFID signals transmitted following such contact, as directed by the server 132.

Figure 1C:
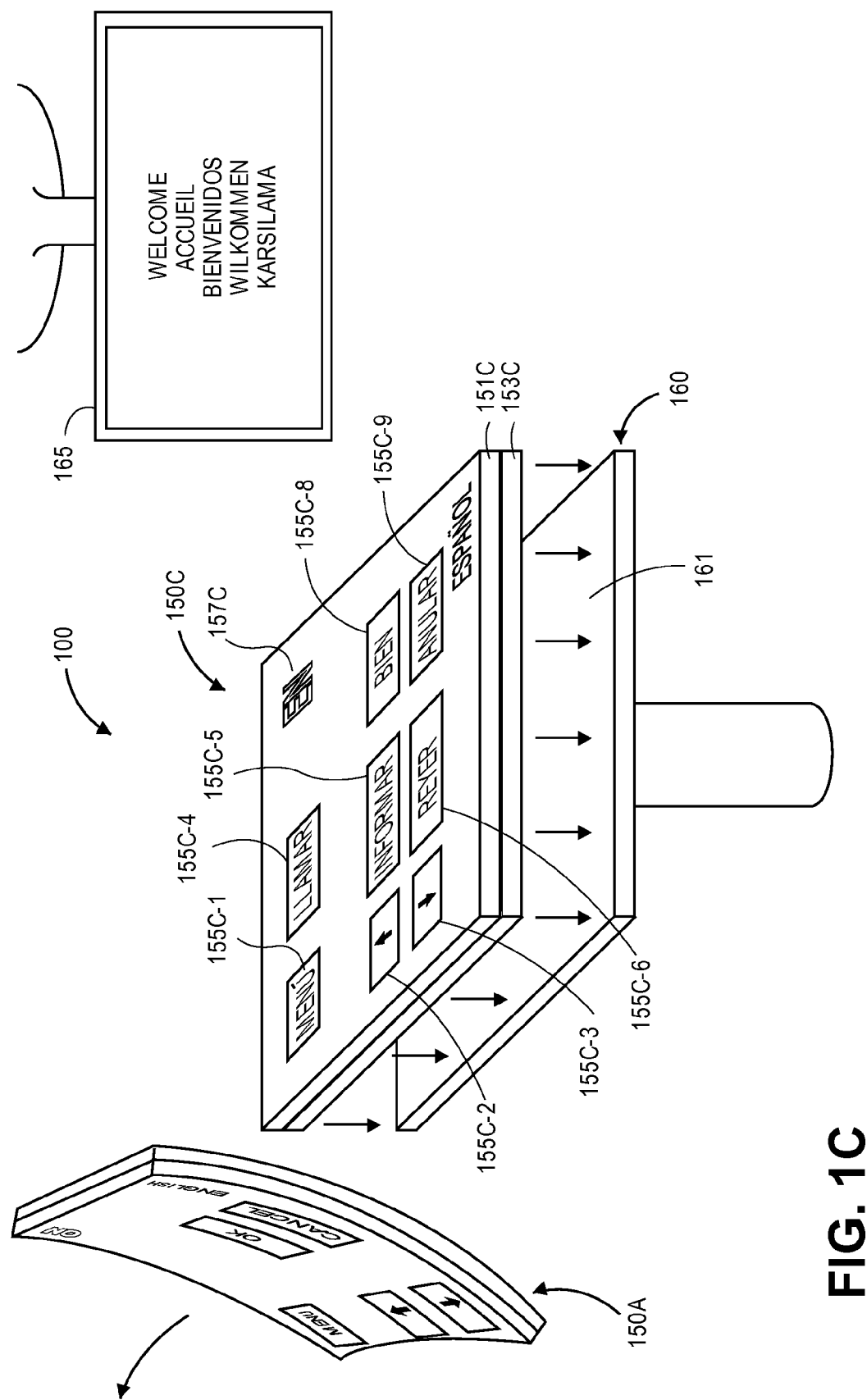

Additionally, the input surfaces and input stations may be customized based on the preferences, qualifications or permissions of a user, as well as the operational requirements of one or more applications with which such surfaces or stations are to be provided, and one or more of different input surfaces may be interchangeably provided at an input station for different users or applications. Referring to FIG. 1C, the system 100 is shown with the input surface 150A removed from the easel 161, and an input surface 150C being placed on the easel 161.

The input surface 150C shown in FIG. 1C includes a top layer 151C and a bottom layer 153C, with a plurality of contact points 155C-1, 155C-2, 155C-3, 155C-4, 155C-5, 155C-6, 155C-8, 155C-9 provided on the top layer 151C. Like the input surface 150A of FIG. 1A, the input surface 150C of FIG. 1C further includes a plurality of manually activated RFID devices (not shown) provided between the top layer 151C and the bottom layer 153C, such that each of the contact points 155C-1, 155C-2, 155C-3, 155C-4, 155C-5, 155C-6, 155C-8, 155C-9 is positioned above a corresponding manually activated RFID device. The input surface 150C of FIG. 1C includes eight contact points 155C-1, 155C-2, 155C-3, 155C-4, 155C-5, 155C-6, 155C-8, 155C-9 (as opposed to five contact points 155A-1, 155A-2, 155A-3, 155A-8, 155A-9 in the input surface 150A of FIG. 1A).

Additionally, the input surface 150C is configured for use by Spanish-speaking users, unlike the input surface 150A of FIG. 1A, which is configured for use by English-speaking users. As is shown in FIG. 1C, the contact points 155C-1, 155C-4, 155C-5, 155C-6, 155C-8, 155C-9 provided on the input surface 150C correspond to Spanish language commands and include text written in Spanish, such as "menú" (or "menu"), "llamar" (or "call"), "informar" (or "report"), "revision" (or "review"), "bien" (or "OK") and "anular" (or "cancel").

Figure 1D:
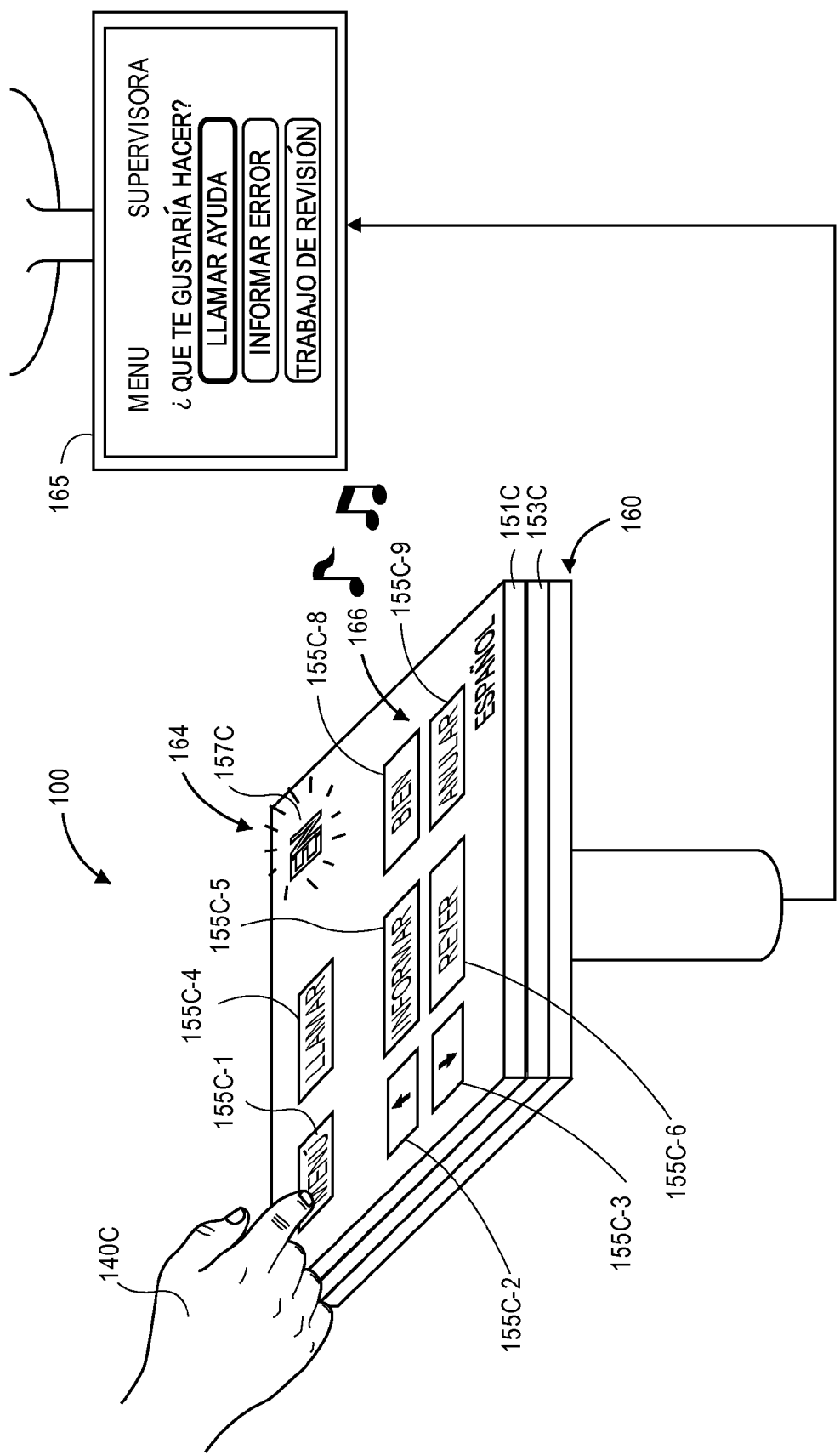

Referring to FIG. 1D, the system 100 is shown with the input surface 150C placed upon the easel 161, and with a user 140C interacting with one or more of the contact points 155C-1, 155C-2, 155C-3, 155C-4, 155C-5, 155C-6, 155C-8, 155C-9. The display monitor 165 includes Spanish-language information and options presented to the user 140C, who is a supervisor, and is thus identified as having a higher level of authority than the user 140A. The user 140C is thus empowered with a different set of menu options, including to "llamar ayuda" (or "call for help"), "informar error" (or "report an error") or "trabajo de revision" (or "review work").

Accordingly, the systems and methods of the present disclosure may be directed to providing flexible, low-cost input devices for use in connection with any computer system or network, or applications operating thereon. Additionally, the number, type and effect of the manually activated RFID devices and/or contact points provided in such input devices may be customized on any basis, such as the preferences (e.g., languages spoken or understood by users, or layouts preferred by users), qualifications (e.g., levels of experience of users) or permissions (e.g., ranks of users, such as a worker or a supervisor) of a given user, or the computer system or network with which the input devices are associated, or one or more applications operating on such a system or network. The input devices may be used to enable one user to supersede another user in the operation of a given system, e.g., based on a specific level of qualification or permission, and the given system may be automatically configured or deconfigured based on the users or input devices that may be recognized. Further, where two or more users have substantially equal levels of qualification or permission, or where collaboration is desired, the two or more users may be permitted to work concurrently on the given system, and to provide inputs of the same type or of different types from their respective input devices.

Computer devices are typically configured to receive information or data from users by way of one or more standard controllers, components, peripherals or other input devices. Some such input devices include keyboards, touch screens or mouses or other pointing devices. Each of these input devices is provided in a standard format and may be connected to a computer via one or more wired or wireless means. For example, a keyboard intended for use by users who are proficient in the English language typically includes keys corresponding to each of the letters A through Z of the Roman alphabet, as well as keys corresponding to the numbers 1 through 10, and keys corresponding to a variety of punctuation marks or other symbols which may be used to directly enter information or data comprising such letters, numbers or symbols into a computer or one or more applications operating thereon. The keyboard may further include a number of operative keys that may be used to execute functions either independently or in combination with one or more other keys rather than to enter data. Such operative keys may include shift keys, control keys, option keys, command keys, lock keys (e.g., "CAPS LOCK" or number lock keys) or function keys. Likewise, a mouse or other pointing device is typically provided with two or more buttons, balls or scroll wheels, or may comprise an open track pad that may be contacted by one or more fingers or other portions of a user's hands in order to manipulate an on-screen pointer and select one or more on-screen interactive features.

Programmers of hardware components or software applications typically must configure such components or applications to receive information, data, commands or instructions by way of a standard input device, such as a keyboard or a mouse, and map interactions with aspects of such input devices (e.g., the keys of the keyboard or the buttons or tactile features of the mouse) to one or more operative commands of such components or applications, often in seemingly random or unnatural combinations with one another. Presently, however, the converse is not possible, as input devices cannot be customized or configured for a particular component or application. For example, even if a particular application requires the use of a small number of keys or the execution of a finite list of commands, a standard-issue keyboard including a complete set of keys (e.g., twenty-six letter keys, ten number keys, and a variety of keys for entering punctuation marks or symbols, or executing functions in combination with one or more other keys) is provided. Likewise, even if a pointer need only be manipulated in a limited number of directions, or if the pointer is only required to interact in a handful of ways, a general-purpose pointer such as a mouse, a trackball or a track pad having a predetermined number of buttons is provided.

Moreover, the layout of the keys, buttons or other interactive features on an input device is traditionally fixed, thereby requiring users adapt themselves to their input devices, as they are unable to adapt the input devices to themselves. For example, in the United States, the vast majority of keyboards are provided in a QWERTY layout, which has been provided in commercial typing devices for nearly one hundred fifty years. While the QWERTY layout may be preferred for many users, if not most users, some other users may prefer to arrange the keys of a keyboard in a different layout according to their personal preferences or levels of experience, particularly in applications for which each of the keys is not required, but are powerless to do so. Similarly, numeric keypads on telephones are typically provided with rows of numbers 1, 2 and 3 at the top, numbers 4, 5 and 6 in the middle and numbers 7, 8 and 9 at the bottom, while numeric keypads on calculators or computer input devices are typically provided with rows of numbers 7, 8 and 9 at the top, numbers 4, 5 and 6 in the middle and numbers 1, 2 and 3 at the bottom. Users of telephones or computers who prefer a consistent configuration of the numbers on their telephones and their calculators, or alternate configurations of the numbers, are not currently provided an option to modify either configuration to suit their respective preferences.

Traditional input devices are typically fixed, rigid components formed from durable materials such as light metals (e.g., aluminum), rubbers or plastics having suitably high densities of polyethylenes, and including their own onboard power sources and communications components (e.g., wired or wireless means) for transmitting signals to and receiving signals from one or more computer systems or networks. Moreover, connecting an input device to a computer system or network typically requires inserting a wired connection of the input device into an associated port or inlet of the system or network, or synchronizing (e.g., pairing) the input device with the system or network according to one or more wireless protocols or specifications (e.g., Bluetooth®).

RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader or reading system, which may include antennas or other like devices. Data stored within a microchip or other memory component or storage device associated with the RFID tag may be sent to the RFID reader, which may interpret not only the data received in the RFID signal but also other relevant information or attributes of the RFID signal, e.g., an intensity or a frequency of the RFID signal, as well as a direction from which the RFID signal originated, a range traveled by the RFID signal or metadata associated with the transmission of the RFID signal. The transfer of the RFID signal is initiated when an electric field or a magnetic field emitted by an RFID reader is sensed by an RFID tag, which transmits information or data that may be stored in association with the RFID tag in one or more microchips or other storage devices.

RFID-based communication systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between one and one hundred centimeters, or 1-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, the systems and methods of the present disclosure may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The systems and methods of the present disclosure are directed to providing devices or components for transmitting and receiving input signals using RFID technology. More specifically, the systems and methods of the present disclosure feature portable input surfaces having one or more manually activated RFID transmitters or other transmitting devices that are in communication with input stations having RFID reading systems with one or more RFID antennas or other receiving devices for the purpose of providing information, data, commands or instructions to one or more computers devices, systems or networks. The portable input surfaces and the input stations disclosed herein may be physically distinct from one another, yet functionally joined with one another, and may communicate via RFID signals in a low-cost, flexible and customizable manner that may be specifically tailored to a user, a computer system or an application, or to a specific environment in which the portable input surfaces and the input stations are provided.

The portable input surfaces of the present disclosure may include a plurality of manually activated RFID tags, e.g., RFID tags that may be caused to transmit one or more RFID signals in response to human contact, that are provided in association with one or more flexible layers. For example, the manually activated RFID tags may be affixed or adhered to and/or provided between two or more layers, such as the input surface 150A of FIGS. 1A through 1D, which includes manually activated RFID devices 152A-1 through 152A-9 between the top layer 151A and the bottom layer 153A. Alternatively, the manually activated RFID tags may be applied to or otherwise provided in association with a single layer, e.g., affixed or adhered to an underside of a layer that may be laid down upon a working surface. The layers may be formed from one or more flexible layers including paper (laminated or unlaminated), plastics, vinyls, rubbers, woven or non-woven fabrics, or any other sufficiently pliable sheet-like materials. The manually activated RFID tags may be applied or affixed to the layers by adhesives (such as glues or pastes), single-layer or double-layer tapes, stitching or any other like means, and provided in a regular pattern or layout, e.g., the grid-like arrangement of the manually activated RFID devices 152A-1, 152A-2, 152A-3, 152A-4, 152A-5, 152A-6, 152A-7, 152A-8, 152A-9 of FIG. 1A, or in any irregular pattern or layout.

At least a portion of the portable input surfaces may include or comprise one or more keys or representations of keys provided thereon, such that touching or otherwise contacting one of the keys or representations while the portable input surfaces are within a range of an RFID antenna causes one or more of the manually activated RFID tags to be activated, and an RFID signal to be transmitted to the RFID antenna. The manually activated RFID tags may include microchips or other memory components having information or data stored thereon, and the information or data may be transmitted upon contact with the manually activated RFID tags. Moreover, the portable input surfaces may further include one or more automatically activated RFID tags that may be configured to transmit information or data when present within a range of an RFID antenna.

The thin nature of the input devices (e.g., the portable input surfaces) of the present disclosure may also enable a number of such devices or surfaces to be provided within a book or another portable and accessible physical structure. For example, a manual for operating a home theater system or for troubleshooting a microwave oven may include one or more pages having portable input surfaces therein, such that contact with designated portions of such pages within a vicinity of an RFID reader associated with the home theater system or the microwave oven may cause one or more computer-based actions to be performed, or one or more computer instructions to be issued. Moreover, a system may receive signals or instructions from a single portable input surface, or from multiple portable input surfaces simultaneously.

The input stations may include one or more RFID antennas provided within a working environment and in communication with one or more computer systems or networks. For example, the RFID antennas may be installed upon or embedded within a working surface (e.g., the RFID antenna 162 within or on the easel 161 of FIG. 1A) upon which a portable input surface may be provided, or suspended or mounted above or within a vicinity of a location where a user may be expected to use a portable input surface to access the one or more computer systems or networks.

The systems and methods of the present disclosure may customize the portable input surfaces and input stations, and the manner in which signals received from such surfaces and stations are interpreted, in a number of ways. For example, referring again to the input surface 150A of FIG. 1A, each of the manually activated RFID devices 152A-1, 152A-2, 152A-3, 152A-4, 152A-5, 152A-6, 152A-7, 152A-8,

152A-9 may be independently programmed with different information or data that may be transmitted in an RFID signal upon contact with the top layer 151A, or not to transmit any data at all. Based on the application in which the portable input surfaces are provided, one or more of the manually activated RFID devices provided within a portable input surface may be active or inactive, e.g., may be programmed to transmit a predetermined RFID signal upon contact with an associated contact point, while one or more other manually activated RFID devices may be inactive, e.g., not configured to transmit any type or form of RFID signal upon contact.

Therefore, the portable input surfaces disclosed herein may be automatically programmed to include any given number of keys or representations of keys as may be required by a given application, but only that number, if need be. Moreover, where the RFID devices of a portable input surface are provided between a number of layers, e.g., the top layer 151A and the bottom layer 153A of the portable input surface 150A of FIGS. 1A through 1D, one or more of the layers which include visible contact points provided thereon may be removed and replaced after the various RFID devices therein have been reprogrammed or reconfigured, to ensure that the visible contact points correspond to the newly programmed or configured RFID devices.

For example, where a worker within an industrial environment is required to provide information or data regarding the status of ongoing operations to a computer system, a portable input surface associated with the computer system may be provided with buttons or selectable features corresponding to letters or numbers, as necessary, as well as function keys such as "OK," "CANCEL" or "CONTACT BOSS." Therefore, rather than having to enter specific combinations of keys in order to accept or cancel an entry, or communicate with his or her superiors, the worker may take such actions (e.g., approving or canceling an action, or requesting assistance) simply, and with a single touch of a designated portion of the portable input surface.

Furthermore, the systems and methods of the present disclosure may also be configured to identify a specific input device, or a user thereof, and take a requested action or follow a requested instruction only if the user is recognized as being authorized to take the action or issue the instruction. The user may be identified by any means or on any basis, including but not limited to an RFID signal received from an RFID tag included or provided in an identification badge worn by the user, or from one or more computer devices or other articles or devices associated with the user. Similarly, the input device may also be identified by any means or on any basis, including but not limited to an RFID signal received from an RFID tag included or provided therein, such as the RFID device 152A-10 of the input surface 150A of FIG. 1A.

Thus, the systems and methods disclosed herein may be configured to authenticate a user based on his or her mere presence, and to take actions or follow instructions entered into an input device only upon confirming that the user is authorized to order such actions or issue such instructions, e.g., upon receiving a predetermined confluence of RFID signals from designated RFID devices, such as an identifying RFID signal transmitted by an RFID device associated with the user, and an identifying RFID signal transmitted by the input device, along with one or more RFID signals incorporating such actions or instructions that are transmitted upon contact with one or more contact areas of the input device, and not simply upon receiving the actions or instructions from the input devices alone.

Requiring the receipt of RFID signals from a combination of manually activated RFID tags within a portable input surface and one or more automatic (or non-manually activated) RFID tags associated with users or input stations enables the commingling of information, data, commands or instructions provided by users with sets of accessible characteristics describing or relating to such users, e.g., their native languages, proficiencies with specific computer systems, networks or applications, or operating permissions, and any other relevant properties. Moreover, the capacity to specifically link a user or a portable input surface with information, data, commands or instructions provided to a computer system, network or application may further reconcile gaps in presence and culpability. For example, when a confluence of RFID signals is received at an input station from RFID tags identifying a user or a portable input surface, and transmitting information, data, commands or instructions provided via the portable input surface, the time and date at which the information, data, commands or instructions were provided, and the user or the console from which the information, data, commands or instructions were provided, may be immediately and readily identified.

Additionally, the input devices of the present disclosure, including but not limited to the input surfaces 150A, 150C or the input station 160 of FIGS. 1A through 1D, may be configured to provide one or more types or forms of feedback to users thereof by way of one or more feedback devices. For example, a portable input surface or an input station may include one or more LED lights or other illuminators that are configured to illuminate light of any color when the portable input surface is within range of the input station or is being operated by an authorized user, or when the user has contacted one or more contact points and caused one or more RFID signals to be transmitted therefrom. Alternatively, the lights or illuminators may indicate that a sufficiently strong electric or magnetic field is available, or that the one or more components is sufficiently powered. Similarly, the input devices of the present disclosure may further include one or more speakers or other audio output devices for emitting audible feedback in response to such contact. The input devices may also include one or more vibrating elements including one or more masses, springs, magnets, coils or other electromechanical elements for generating feedback in the form of vibration that may be sensed by a user upon contact. Feedback devices may be configured to provide general feedback, e.g., a common type of feedback provided in response to contact with or activation of any portion of an input device, or specific feedback, e.g., a particular type of feedback provided in response to contact with or activation of a specific portion or location of an input device, in accordance with the present disclosure. For example, some input devices may illuminate a single light, emit a common noise or vibrate at a predetermined frequency or intensity for a predetermined period of time in response to any contact with the input devices, while other input devices may illuminate specific lights, emit predetermined noises, or vibrate at different frequencies or intensities or for varying periods of time in response to contact with particular portions of the input devices. Any type or form of feedback device may be provided in association with the input devices disclosed herein in accordance with the present disclosure.

Figure 2:
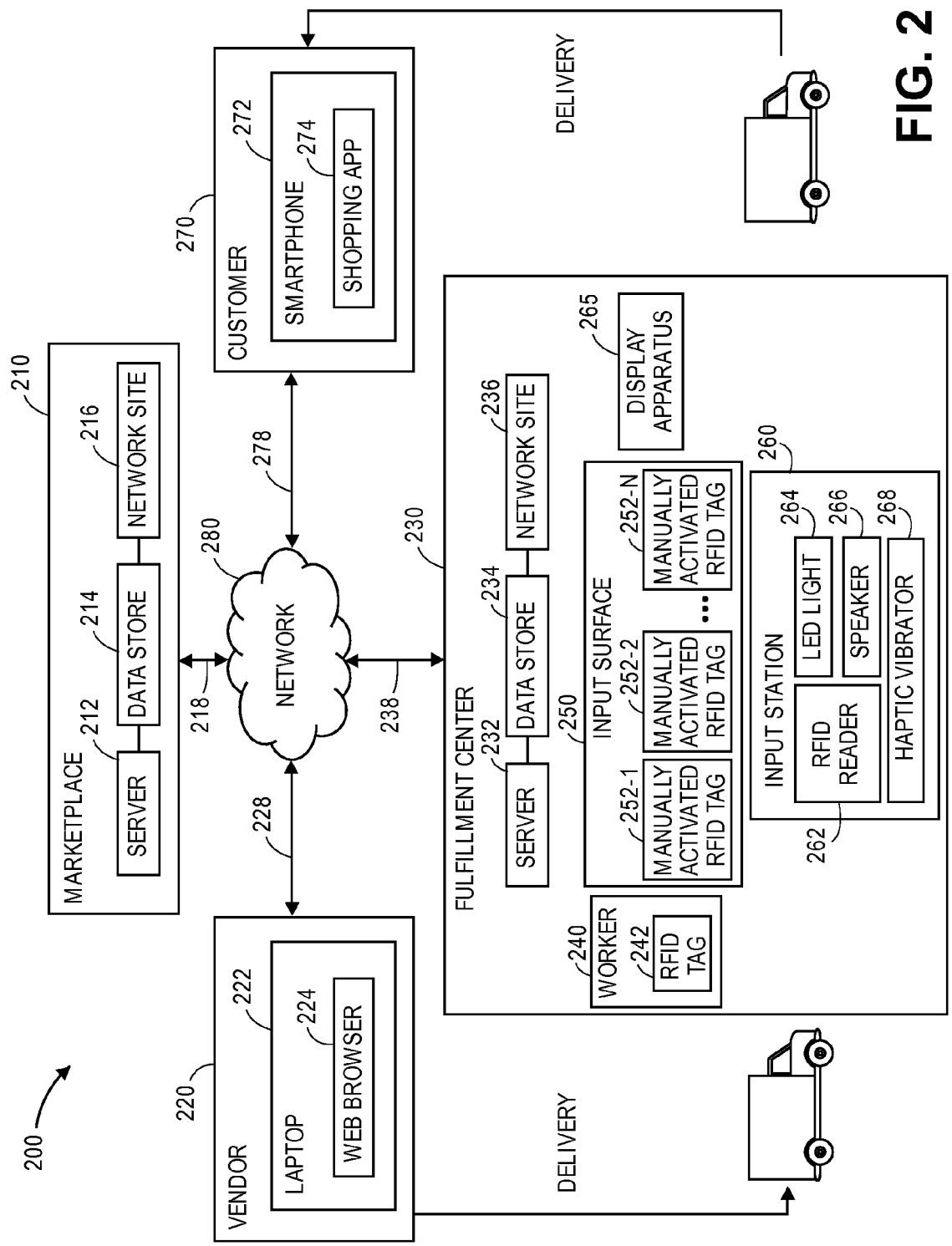
FIG. 2 is a block diagram of components of one system including a dynamic RFID-based input device in accordance with embodiments of the present disclosure.

Referring to FIG. 2, a block diagram of components of one system 200 including a dynamic RFID-based input device in accordance with embodiments of the present disclosure is shown. The system 200 includes a marketplace 210, a vendor 220, a fulfillment center 230 and a customer 270 that are connected to one another across a network 280, such as the Internet. Except where otherwise noted, reference numerals preceded by the number "2" in FIG. 2 indicate components or features that are similar to components or features having reference numerals preceded by the number "1" in FIGS. 1A through 1D.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data store 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information in the form of digital or analog data regarding one or more items to be made available at the marketplace 210 or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, data stores (e.g., databases) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations, storage areas and distribution stations. The fulfillment center 230 further includes at least one worker 240, at least one input surface 250, at least one input station 260 and at least one display apparatus 265.

The worker 240 may be any designated personnel tasked with performing one or more tasks within the fulfillment center 230, and may wear, carry or otherwise be associated with or adorned with an RFID tag 242 that may emit a unique RFID signal associated with the worker 240 when the worker 240 is within range of an RFID reading system, such as the RFID reader 262. The worker 240 may handle or transport items within the fulfillment center 230, or operate one or more pieces of equipment therein. For example, the worker 242 may also operate one or more specific computing devices for registering the receipt, retrieval, transportation or storage of items within the fulfillment center 230, or a general purpose device such as a personal digital assistant, a digital media player, a smartphone, a handheld computer device, a tablet computer, a desktop computer or a laptop computer (not shown), which may be associated with the server 232, the data store 234 or the processor 236, or with one or more external computer devices that may be accessed via the network 280. The worker 240 may interact with such computer devices using any type or number of input or output devices, including but not limited to the input surface 250 or the input station 260.

The input surface 250 may be any type or form of substantially thin layer or substrate having a plurality of n manually activated RFID tags 252-1, 252-2 . . . 252-n associated therewith. Preferably, the input surface 250 comprises one or more layers of flexible material such as paper, plastic, rubber or fabric having a plurality of manually activated RFID tags 252-1, 252-2 . . . 252-n disposed thereon or therebetween, such as the input surface 150A of FIG. 1A, with the plurality of RFID devices 152A-1 through 152A-9 disposed between the top layer 151A and the bottom layer 153A. The RFID tags 252-1, 252-2 . . . 252-n may include one or more static or dynamic microchips or other memory components that may store information or data to be transmitted when contact is made with one or more portions of the input surface 250 that may be associated with the RFID tags 252-1, 252-2 . . . 252-n. In accordance with the present disclosure, the input surface 250 may further include one or more feedback devices, such as speakers, lights or vibrating elements (not shown), as well as one or more active or passive RFID tags (not shown) that may be configured to transmit RFID signals containing information or data regarding the input surface 250 or one or more workers, such as the worker 240, when the input surface 250 is within range of an electric or magnetic field provided by an RFID reading system, such as the RFID reader 262.

The input station 260 may be any location, region, section or aspect of the fulfillment center 230 at or within which one or more general or specific tasks or functions may be performed by one or more workers, such as the worker 240, either independently or under the supervision of one or more managers or supervisors (not shown). The input station 260 be provided in association with any number of structures, facilities or machines, e.g., any industrial, commercial or other type or form of equipment or component including but not limited to boilers, computers, conveyors, drills, filtration systems, generators, lathes, lifts, motors, presses, pumps, robots, tanks, turbines, valves, vehicles, or any other type or form of machine.

As is shown in FIG. 2, the input station 260 includes the RFID reader 262 and one or more LED lights 264, audio speakers 266 and haptic vibrators 268. The RFID reader 262 is any type of sensor or interrogator that may be provided for use in connection with signals transmitted from one or more active or passive RFID tags, including but not limited to the RFID tag 242 or one or more of the manually activated RFID tags 252-1, 252-2 . . . 252-n, or any other RFID tags that may be associated with the worker 240 or the input surface 250, or other aspects of the fulfillment center 230.

The RFID reader 262 may include one or more components for transmitting or receiving signals, such as a plurality of RFID antennas that may be provided throughout the input station 260, e.g., one or more of the RFID antennas 162 distributed throughout the easel 161 of the input station 160 shown in FIG. 1A, as well as any type or number of circuitry components for processing and controlling the operation of the RFID reader 262. Additionally, the RFID reader 262 or the associated antennas may be formed within an integral unit of a working surface at the input station 260. Such working surfaces may include a desk, table, workbench, easel, podium or like component, and may comprise freestanding elements, or may be mounted to and extended from a wall or other location at the input station 260. Alternatively, the RFID reader 262 and its associated antennas may be mounted to or suspended above, within or around a working environment associated with the input station 260, and operatively connected to one or more computer systems or networks by wired or wireless means.

According to some embodiments, one or more of the RFID antennas associated with the RFID reader 262 may be configured to receive RFID signals from RFID tags that are located within short operational ranges, e.g., approximately one inch (1") of one of the antennas, which may be determined by one or more factors including but not limited to the sensitivity or transmitting power of the RFID reader 262, as well as the corresponding sizes of the RFID antennas with respect to the sizes of the RFID tags. Additionally, the RFID reader 262 may communicate with RFID tags by way of any coupling modes or methods that may be known to those of ordinary skill in the pertinent arts. For example, an RFID tag may modulate one or more elements of the data stored thereon, and transmit a modulated data signal to a receiving circuit associated with the RFID reader 262. Subsequently, the RFID reader 262 may then demodulate the data signal, and provide a processed set of data derived from the data signal to the server 232 or another computer device for further processing.

Moreover, the RFID reader 262 may be configured to capture, evaluate, transmit or store any available information regarding signals received from one or more RFID tags, including information regarding any attributes of the signals, including but not limited to sensed signal strengths or intensities, angular directions or ranges to the RFID tags from which such signals were received, any differences between the strengths, intensities, angular orientations or ranges associated with two or more signals, or information or data included in the signals. Although the input station 260 of FIG. 2 is shown as including a single RFID reader 262, any number of RFID readers 262 may be provided throughout the input station 260, and in any number of specified locations, in accordance with the present disclosure.

The input station 260 may be further configured to provide feedback to the worker 240 using the LED light 264, the speaker 266 or the haptic vibrator 268, or any other type or form of feedback device (not shown). The LED light 264 may comprise one or more LED elements that may be automatically controlled or configured to emit light in any frequency, intensity or hue. Alternatively, any type or form of light element, in addition to LED lights, may be provided in accordance with the present disclosure. The speaker 266 may be any physical component that may be automatically controlled or configured to transmit audible messages, signals or sounds. The haptic vibrator 268 may be any physical component that may be automatically controlled or configured to generate tactile vibrations of any frequency or intensity. Although the input station 260 of FIG. 2 is shown as including just one LED light 264, one speaker 266 and one haptic vibrator 268, any number of lights, speakers or vibrators may be provided throughout the input station 260 in accordance with the present disclosure. Moreover, one or more feedback devices may be provided throughout the input surface 250, subject to functional or spacing limitations or constraints. Such feedback devices may be configured to provide general feedback, e.g., feedback of a common type or form upon receiving an RFID signal in response to contact with the input surface 250, or specific feedback, e.g., feedback of a unique type or form upon receiving a particular RFID signal in response to contact with a localized portion of the input surface 250, in accordance with the present disclosure.

Additionally, one or more display apparatuses 265 may be provided within the input station 260, or within a vicinity of the input station 260. The display apparatus 265 may be used to provide information or data in the form of still or moving images and any related audio signals to workers within the input station 260 or nearby, including the worker 240, or any other workers. In particular, the display apparatus 265 may be further used to display some or all of the information provided to the input surface 250 by the worker 240, or to provide any type or form of feedback to the worker 240.

The fulfillment center 230 may operate one or more order processing and/or communication systems using computer devices in communication with one or more of the server 232, the data store 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e g, manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the RFID reader 262, and with one or more workers (e.g., the worker 240), or the various storage facilities and other components of the fulfillment center 230. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of portable input surfaces including one or more manually activated RFID devices or tags that are provided in a fulfillment center environment, e.g., input surfaces for receiving information or data regarding items being received, stored, prepared for delivery or delivered at the fulfillment center, and for transmitting such information to one or more computer systems or networks by way of an input station, the systems and methods disclosed herein are not so limited. Rather, the portable input surfaces and input stations disclosed herein may be utilized in any environment in which information, data, commands or instructions are to be provided to one or more computer systems or networks by any number of users, and are particularly useful in environments in which such information, data, commands or instructions must be entered, received and stored relatively quickly, including but not limited to environments in which traditional power supplies are not reliable or may not be readily accessed.

Figure 3:
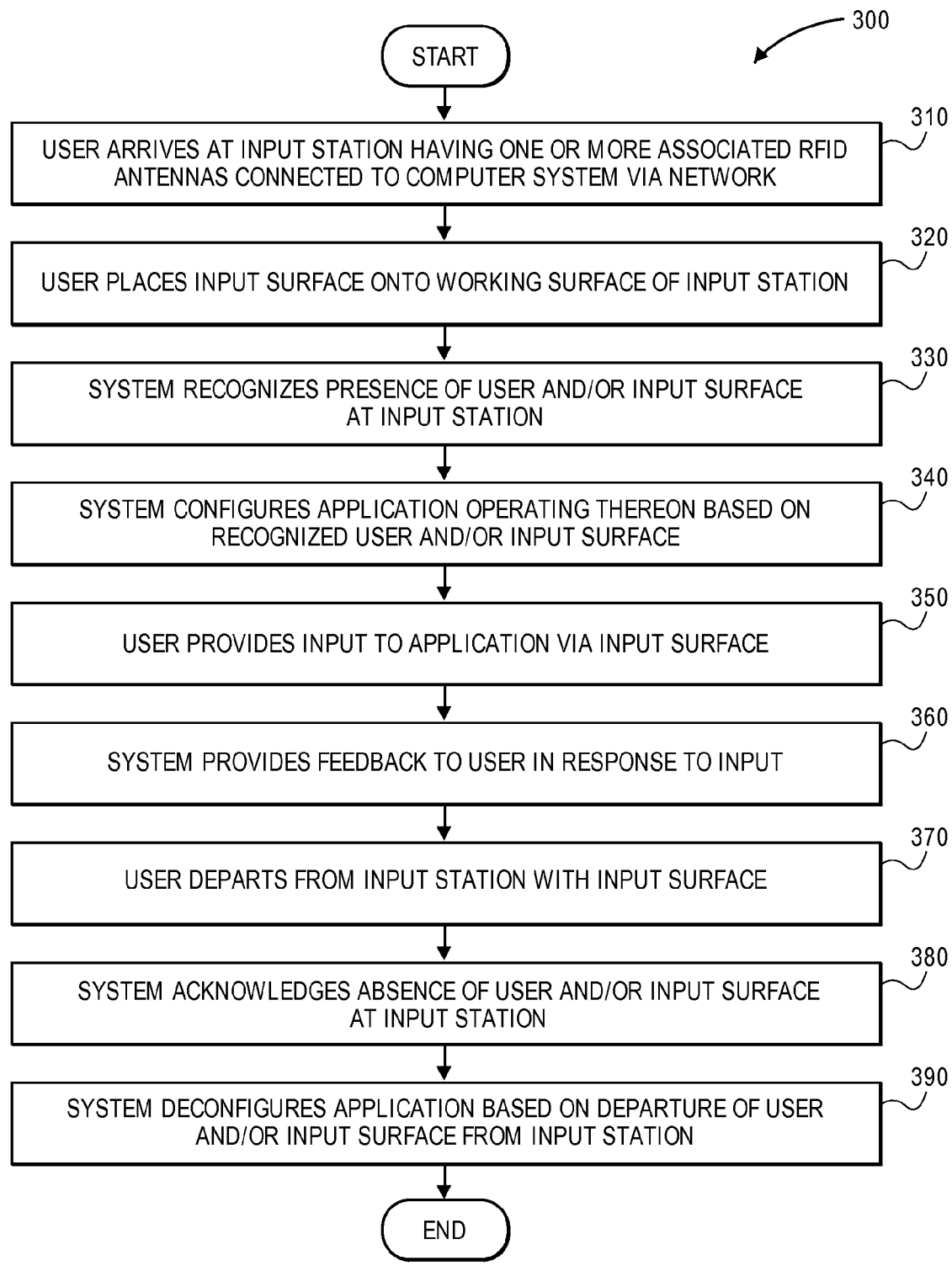
FIG. 3 is a flow chart of one process utilizing a dynamic RFID-based input device in accordance with embodiments of the present disclosure.

As is discussed above, some embodiments of the present disclosure are directed to the use of substantially thin, low-cost input devices or controllers, e.g., portable input surfaces in communication with input stations, that are configured to provide information, data, commands or instructions in the form of RFID signals to one or more computer systems or networks and may be customized according to the preferences, qualifications or permissions of a given user, or the specific functions or attributes of a computer system or network, or an application operating thereon. Referring to FIG. 3, a flow chart 300 representing one process that utilizes a dynamic RFID-based input device in accordance with embodiments of the present disclosure is shown.

At box 310, a user arrives at an input station having one or more associated RFID antennas connected to a computer system via a network. The input station may be provided in any context, such as one or more industrial or commercial environments, e.g., a fulfillment center, and the RFID antennas may be provided in any manner, e.g., mounted above, below or nearby one or more stations, or embedded directly within one or more working surfaces. At box 320, the user places an input surface onto a working surface at the input station. The working surface may be a desk, a table, a workbench, an easel, a podium or another like platform at which the user may conduct one or more operations.

At box 330, the system recognizes the presence of the user and/or the input surface at the input station. The system may recognize the user by any means or method, e.g., by interpreting an RFID signal received from an RFID tag or device associated with an identification badge worn or carried by the user, by facial recognition techniques, or by any type or form of authentication procedure. Similarly, the system may recognize the input surface based on an RFID signal received from an RFID tag or device associated with the input surface, e.g., the RFID device 152A-10 provided in the input surface 150A of FIG. 1A, by reading and optically interpreting a marked identifier (e.g., a bar code) provided on a portion of the input surface, or by any other means.

At box 340, the system configures an application operating thereon based on the recognized user and/or the input surface. For example, upon recognizing the user at box 330, the system may automatically configure the application in accordance with the established preferences or work history of the user, and prepare the application to receive information, data, commands or instructions from the user. Similarly, where the system includes a number of applications that may be operated by one or more users, the system may identify a specific application for which the input surface is intended, e.g., a spreadsheet, a word processor, or another form of data entry application, and may prepare the application to receive information, data, commands or instructions from the input device.

At box 350, the user provides an input to the application via the input surface. The user may activate one or more keys or representations of keys provided on the input surface, e.g., one or more of the contact points 155A-1, 155A-2, 155A-3, 155A-8, 155A-9 provided on the top layer 151A of the input surface 150A of FIG. 1A, above the corresponding RFID devices 152A-1, 152A-2, 152A-3, 152A-8, 152A-9, thereby causing one or more of the devices to transmit RFID signals to one or more RFID antennas associated with the input station, and an input may be derived based on such RFID signals and transmitted to the application. At box 360, the system provides feedback to the user in response to the input. The feedback may take any form, including by displaying information or data regarding or in response to the input on one or more computer displays, e.g., by displaying some or all of the information provided in the input, or by displaying information or data evincing the execution of a command included in the input. Alternatively, the feedback may comprise the illumination of one or more lights provided in the input surface or on or around the input station, the playing of one or more sounds on a speaker, or the vibration of one or more haptic elements provided in or around the input station.

At box 370, the user departs from the input station with the input surface, and at box 380, the system acknowledges that the user and/or the input surface are no longer present at the input station. For example, if the user and/or the input surface was recognized at box 330 based on an RFID signal received at an RFID antenna at the input station from an RFID device provided in an identification badge or elsewhere on the user, or on the input surface, the RFID signal will dissipate when the user and/or the input surface are no longer within range of the RFID antenna. At box 390, the system deconfigures the application, e.g., removes or cancels the configuration that was implemented at box 340, based on the departure of the user and/or the input surface from the input station, and the process ends.

Figure 4A:
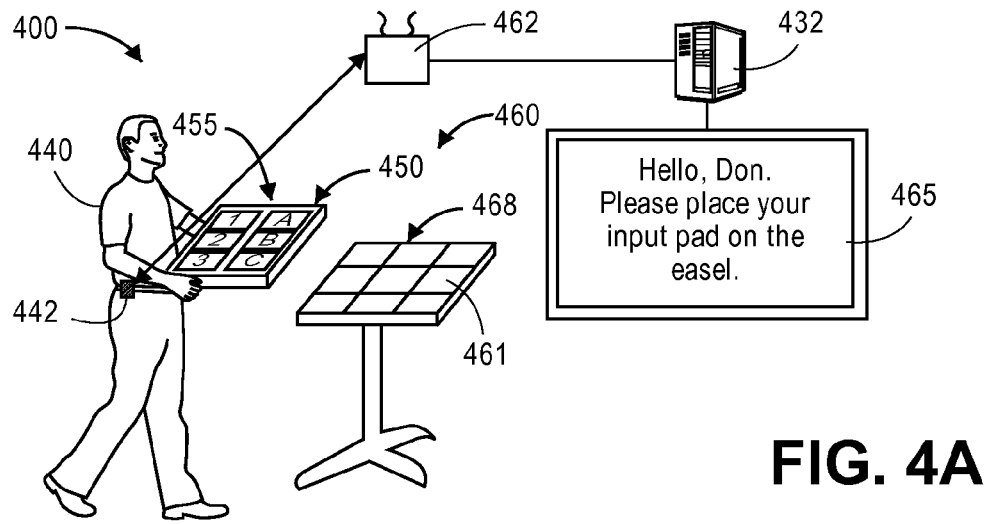
FIGS. 4A through 4C are views of components of one system including a dynamic RFID-based input device in accordance with embodiments of the present disclosure.
Figure 4B:
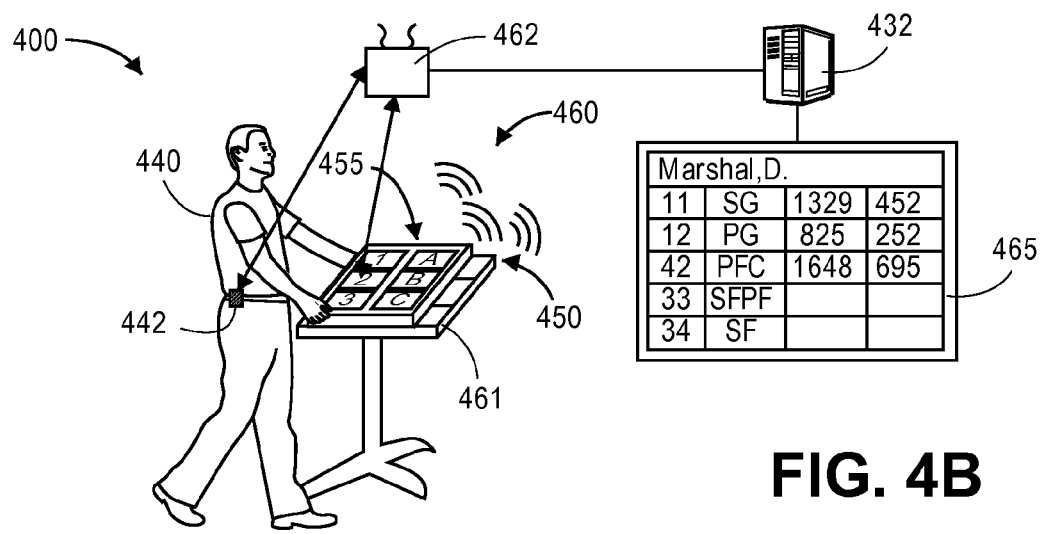
Figure 4C:
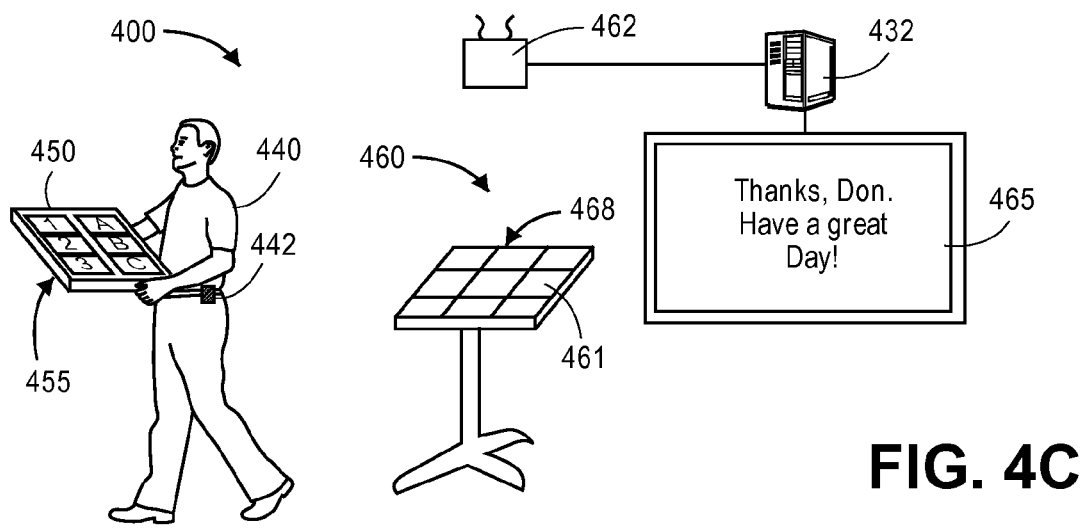

The operation of one embodiment of the systems and methods of the present disclosure may be shown with regard to FIGS. 4A, 4B and 4C, in which views of components of one system 400 including a dynamic RFID-based input device in accordance with embodiments of the present disclosure is shown. Except where otherwise noted, reference numerals preceded by the number "4" in FIGS. 4A, 4B and 4C indicate components or features that are similar to components or features having reference numerals preceded by the number "2" in FIG. 2, or by the number "1" in FIGS. 1A through 1D, respectively.

The system 400 includes a server 432, a worker 440 wearing an RFID tag 442 about his or her waist, an input surface 450 and an input station 460 having a working surface 461, an RFID reading system 462, a display apparatus 465 and a haptic feedback element 468 disposed in the working surface 461. As is shown in FIG. 4A, the worker 440 approaches the input station 460 with the input surface 450. When the worker 440 passes within a range of the RFID reading system 462, an RFID signal identifying the worker 440 is transmitted from the RFID tag 442 to the RFID reading system 462, and the display apparatus 465 instructs the worker 440 to place the input surface 450 on the working surface 461.

As is shown in FIG. 4B, after the worker 440 has been recognized, the server 432 launches an application for receiving information or data from the worker, and the worker 440 may interact with one or more contact areas 455 provided on the input surface 450 to generate one or more RFID signals for providing the information or data to the server 432. At least some of the information or data provided by the worker 440 may be shown on the display apparatus 465. Moreover, the haptic feedback element 468 may provide tactile, vibrational feedback as the information or data is entered at the working surface 461, and the worker 440 may sense the vibrations through the input surface 450. Alternatively, an audio speaker or lighting element (not shown) provided in association with the input surface 450 or the input station 460 may provide feedback to the worker 440 in the form of sounds or lights as the information or data is entered at the working surface 461.

As is shown in FIG. 4C, after the worker 440 has finished entering his information or data, the worker 440 may depart the input station 460. Once the worker 440 is no longer within a range of the RFID reading system 462, the RFID signal is no longer transmitted to the RFID reading system 462 by the RFID tag 442. As a result, the server 432 recognizes that the worker 440 has departed the input station 460, and shuts down the application for receiving information or data from the worker 440.

Accordingly, the systems and methods of the present disclosure may automatically authenticate a user arriving at an input station and launch or configure a computer application for receiving information, data, commands or instructions from the user via a dynamic RFID-based input device that may be customized based on the preferences, qualifications and permissions of the user, or for the particular functions or requirements of the application or a system on which the application operates. When the user is no longer at the input station, the application may be shut down.

Figure 5:
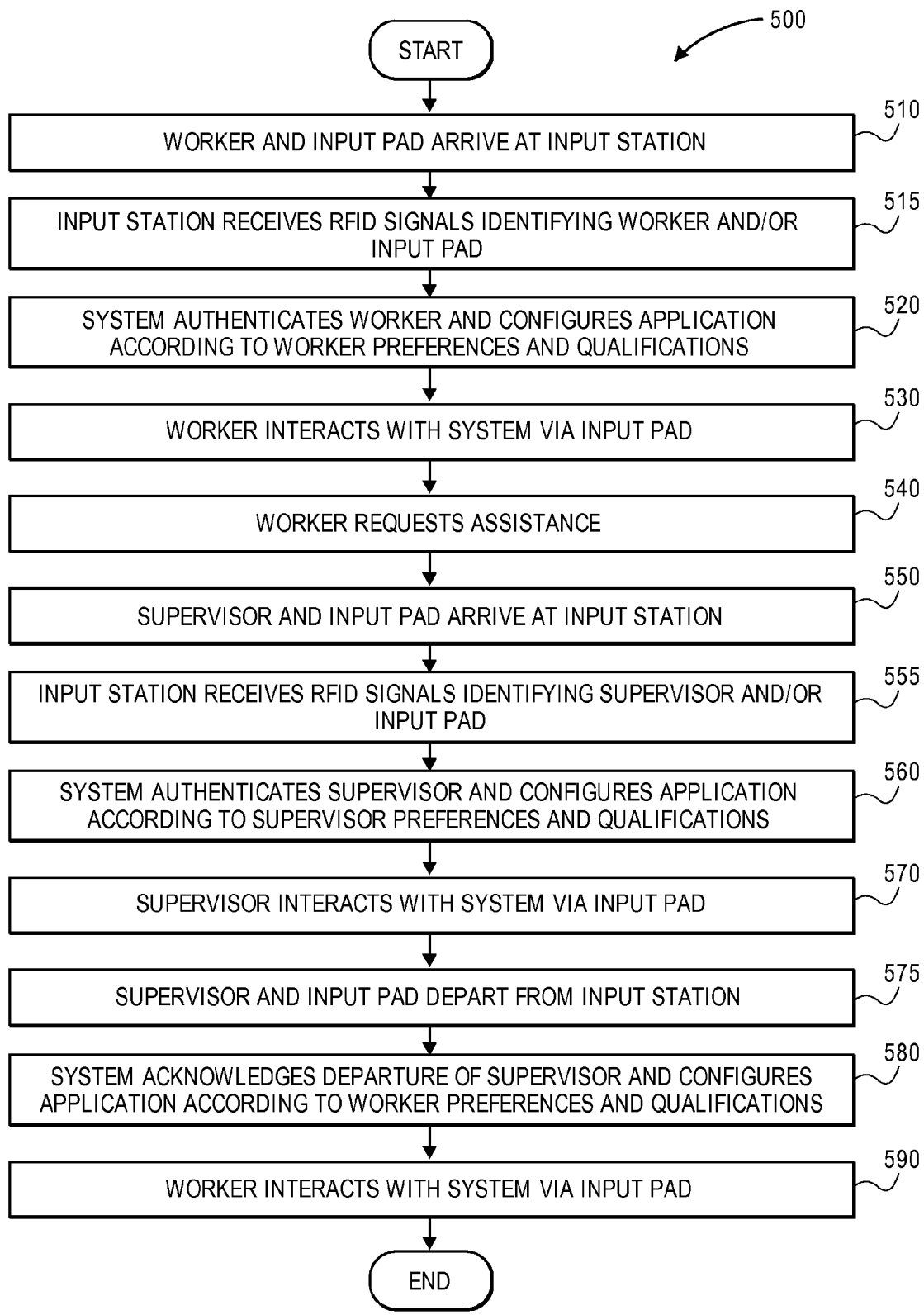
FIG. 5 is a flow chart of one process utilizing a dynamic RFID-based input device in accordance with embodiments of the present disclosure.

The systems and methods of the present disclosure may be further configured to receive information, data, commands or instructions from different users of dynamic RFID-based input devices, and such devices may be customized based on the different preferences, qualifications or permissions of the respective users. Such systems may be particularly valuable in environments in which personnel of various strata (e.g., worker-supervisor, teacher-student, parent-child) may be expected to operate the same computer system or network. Referring to FIG. 5, a flow chart 500 representing one process that utilizes a dynamic RFID-based input device in accordance with embodiments of the present disclosure is shown.

At box 510, a worker and an input pad arrive at an input station, and at box 515, the input station receives RFID signals identifying the worker and/or the input pad. For example, the worker may be identified based on an RFID signal transmitted by an RFID tag or an RFID device provided on an identification badge or token, such as the RFID tag 442 on the worker 440 of FIGS. 4A through 4C, and the input pad may be identified based on an RFID signal transmitted by an RFID tag or RFID device embedded or provided therein, such as the RFID device 152A-10 of the input surface 150A of FIG. 1A. The input station may include any number of RFID antennas and/or readers, including short-range antennas or readers provided within an easel, a desk or other working surface, or suspended overhead or in a vicinity of one or more structures, facilities or machines at the input station. At box 520, the system authenticates the worker and configures the application according to the worker's preferences and qualifications. For example, the system may recognize the rank or position of the worker, as well as a level of experience that the worker has with the system, and any operational preferences such as a language or orientation of keys that may be preferred by the worker.

At box 530, the worker interacts with the system via the input pad. The worker may contact one or more contact points or areas provided on the input pad, and thereby close one or more gaps or breaks in transmitting circuits of manually activated RFID devices provided therein. The manually activated RFID devices may transmit any type or form of information, data, commands or instructions to the system by way of the input pad and the input station.

At box 540, the worker requests assistance for any reason. For example, the worker may be experiencing difficulty with one or more pieces of equipment at the input station, or may have identified a fault with the system, or with one or more components thereof. The worker may request assistance by any intrinsic means, e.g., transmitting one or more general or specific electronic messages to a help desk or other centralized group, or to one or more predetermined persons, or by any extrinsic means, e.g., by raising a hand, placing a telephone call or verbally calling for help.

At box 550, a supervisor and his or her input pad arrive at the input station. In reply to the request for assistance at box 540, the supervisor may report to the input station with a general-purpose input pad, or with an input pad that is specifically tailored to the supervisor's preferences, qualifications or permissions. At box 555, the input station receives one or more RFID signals identifying the supervisor or the input pad, and at box 560, the system authenticates the supervisor, and configures the application to the supervisor's preferences and qualifications. For example, the system may identify the supervisor based on one or RFID signals transmitted from an RFID device provided in an identification badge or token, or on any other basis, and may recognize that the supervisor is of a superior rank or position as compared to the worker, or has a higher level of experience than the worker, and identify one or more preferences of the supervisor. The system may be adapted to recognize the supervisor and permit the supervisor to supersede the operation of any application in a vicinity of his or her input pad or, alternatively, permit the supervisor to operate an application from which his or her assistance was requested. The system may be further adapted to acknowledge that the supervisor has arrived at the input station with his or her input pad, and permit the supervisor and the worker to operate the application concurrently.

At box 570, the supervisor interacts with the system via the input pad. For example, the supervisor may use the input pad to provide a report of the events or circumstances observed at the input station, or a status of the system or the worker, upon his or her arrival. The supervisor may further provide instructions for overcoming a fault or other condition of the system or the input station, or may request one or more additional personnel to report to a vicinity of the input station to address the fault or other condition. The supervisor may further review, edit, delete or confirm one or more actions or sets of information or data previously provided to the system by the worker, or take any relevant action or provide any appropriate instructions to the system.

At box 575, the supervisor and the input pad depart from the input station. At box 580, the system acknowledges the departure of the supervisor from the input station and configures the application according to the preferences and qualifications of the worker. For example, after the supervisor is no longer within a range of an RFID antenna at the input station, an RFID device associated with an identification badge or token associated with the supervisor may no longer transmit one or more RFID signals to the RFID antenna, and the absence of the RFID signal may be understood to imply that the supervisor is no longer present at the input station. Therefore, since the supervisor was summoned to the input station by the worker, the system may reconfigure the application in accordance with the worker's preferences, qualifications or permissions after the supervisor is no longer present there. At box 590, the worker interacts with the system via his or her input pad, e.g., after any faults or conditions plaguing the system have been addressed, and the process ends.

Therefore, the systems and methods of the present disclosure enable a single input station to receive RFID signals from a single input surface operated by multiple users, or from multiple input surfaces operated by such users. The identity of the user interacting with the input surface and causing the RFID signals to be transmitted from the input surface to the input station may be determined by any means, e.g., based on an RFID signal received from an RFID tag provided in an identification badge or token and associated with the user. RFID signals transmitted by the input surface may be understood to constitute valid information, data, commands or instructions if such signals are accompanied by one or more other RFID signals that may be authenticated and associated with an authorized user.

Figure 6A:
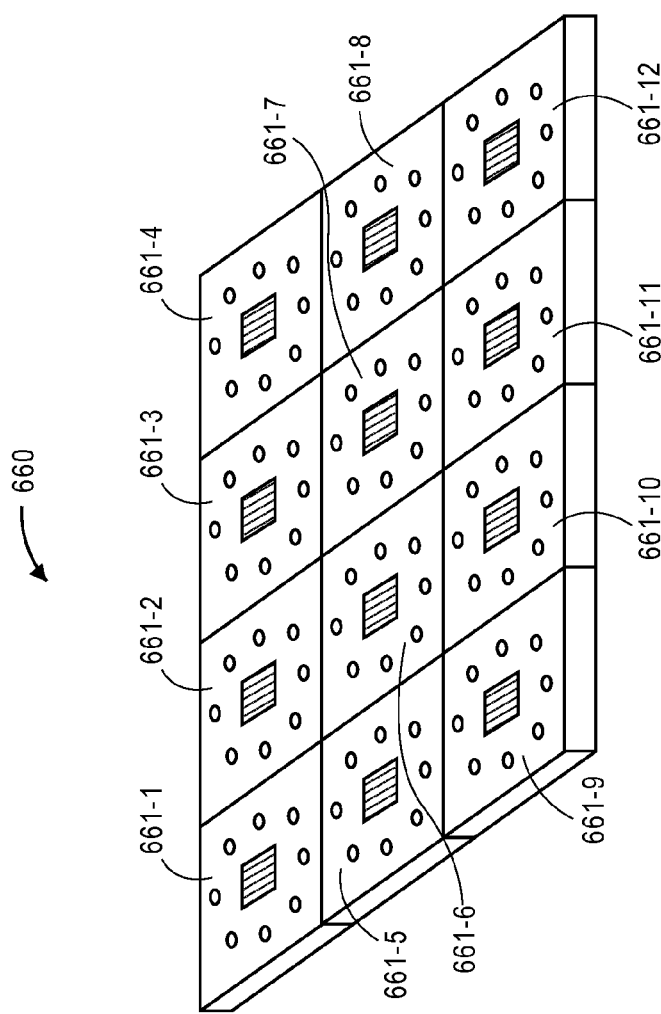
FIGS. 6A through 6C are views of components of one system including a dynamic RFID-based input device in accordance with embodiments of the present disclosure.
Figure 6B:
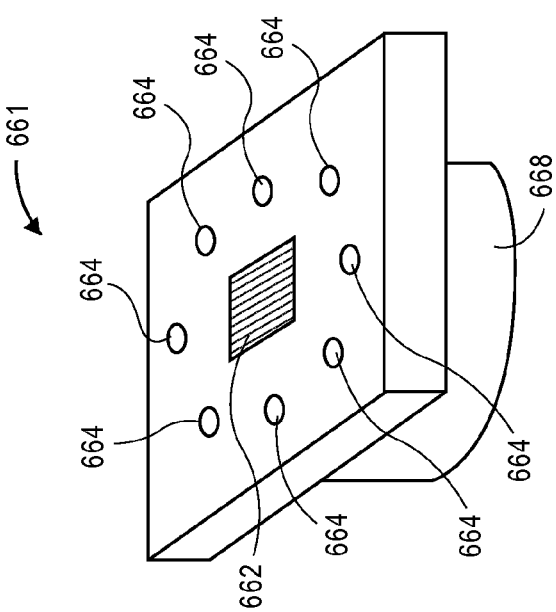
Figure 6C:
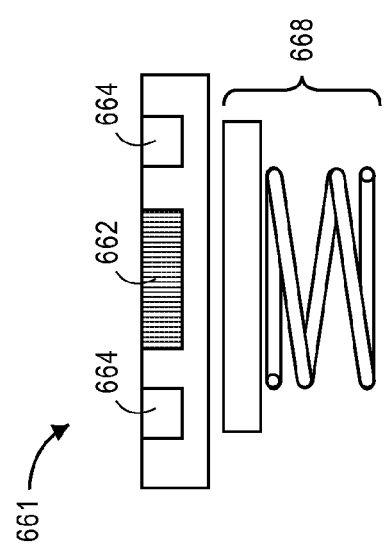

As is discussed above, the systems and the methods disclosed herein may utilize input stations having RFID reading systems and any relevant feedback apparatuses provided in a single structure, e.g., an easel or desk, or in multiple discrete sub-structures, each having their own RFID reading systems and feedback apparatuses. Referring to FIGS. 6A through 6C, views of components of one system including a dynamic RFID-based input device in accordance with embodiments of the present disclosure are shown. Except where otherwise noted, reference numerals preceded by the number "6" in FIGS. 6A, 6B and 6C indicate components or features that are similar to components or features having reference numerals preceded by the number "4" in FIG. 4A, 4B or 4C, by the number "2" in FIG. 2, or by the number "1" in FIGS. 1A through 1D, respectively.

Referring to FIG. 6A, an input station 600 having a plurality of independent sections 661-1, 661-2, 661-3, 661-4, 661-5, 661-6, 661-7, 661-8, 661-9, 661-10, 661-11, 661-12 is shown. Referring to FIG. 6B and FIG. 6C, perspective and section views of one of the sections 661 of the input station 660 is shown. The sections 661-1, 661-2, 661-3, 661-4, 661-5, 661-6, 661-7, 661-8, 661-9, 661-10, 661-11, 661-12 of the input station 660 are provided in a regular grid-like layout. Each of the sections 661 includes an RFID antenna 662 disposed in a substantially central location within a top surface of the section 661, and a ring of illuminators 664 provided in a ringed alignment about the RFID antenna 662, and a haptic element 668 configured to cause the section 661 to vibrate in response to one or more signals.

Input stations such as the input station 660 of FIGS. 6A, 6B and 6C are particularly suited to receiving RFID signals from short-range RFID transmitting devices or tags, and localizing a source of the RFID signal to a specific transmitting device based on the particular RFID antenna 662 that received the RFID signal. The input station 660 is further configured to provide directed feedback to users of input surfaces provided thereon, e.g., feedback that is particularly targeted to a localized region of an input surface in response to contact with that region. For example, the input station 660 may be particularly helpful in situations in which input surfaces of a standard size are provided thereon, in that contact points and/or manually activated RFID tags of the input surfaces may be placed in locations corresponding substantially to the locations of the RFID antennas 662, the illuminators 664 and the haptic elements 668 of the individual sections 661.

Therefore, the substantially uniform distribution of the RFID antennas 662 throughout the input station 660 collectively increase the likelihood that an RFID signal transmitted upon contact with a manually activated RFID tag on the input station 660 will be sensed and interpreted. Moreover, the regular layout of the RFID antennas 662, the illuminators 664 and the haptic elements 668 enables input surfaces (not shown) to be formed with any number of contact points and manually activated RFID tags in locations that are consistent with the regular layout. Furthermore, when one or more of the contact points of an input surface (not shown) provided on the input station 660 is contacted by a user, feedback may be provided in a discrete location associated with the contact, and in the form of lights or vibrations provided by the illuminators 664 or the haptic elements 668 that are closest to the contacted contact points.

Figure 7A:
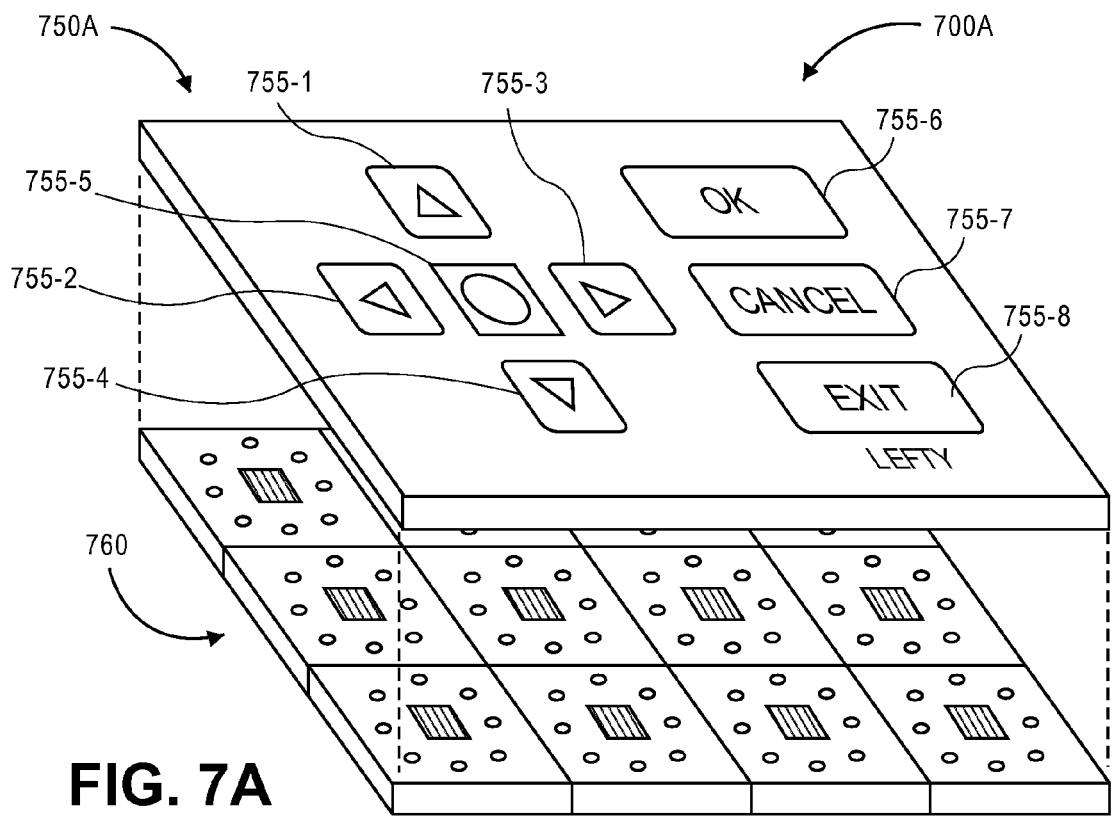
FIGS. 7A and 7B are views of components of one system including a dynamic RFID-based input device in accordance with embodiments of the present disclosure.
Figure 7B:
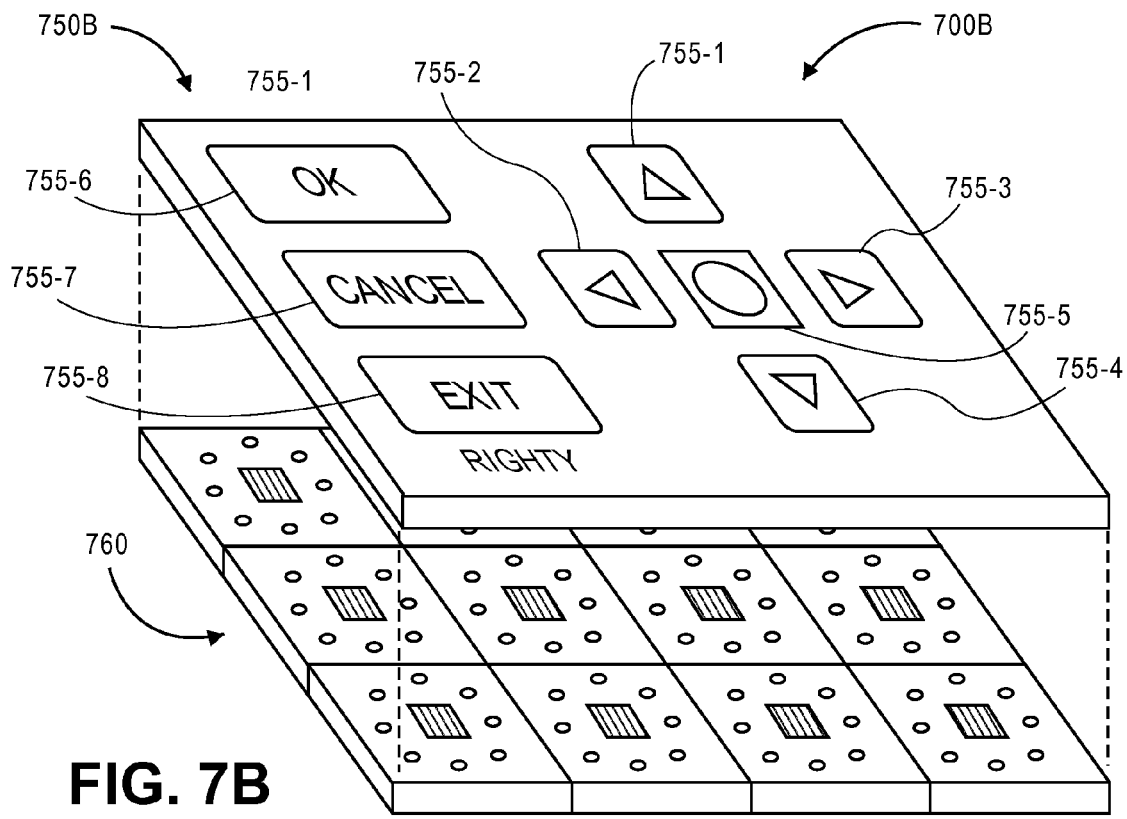

As is discussed above, an input surface may be customized based on the preferences, qualifications or permissions of a user, and the functions or attributes of a given application or a computer system or network on which the application runs. Referring to FIGS. 7A and 7B, views of components of one system 700 including a dynamic RFID-based input device in accordance with embodiments of the present disclosure are shown. Except where otherwise noted, reference numerals preceded by the number "7" in FIGS. 7A and 7B indicate components or features that are similar to components or features having reference numerals preceded by the number "6" in FIGS. 6A, 6B and 6C, by the number "4" in FIG. 4A, 4B or 4C, by the number "2" in FIG. 2, or by the number "1" in FIGS. 1A through 1D, respectively.

As is shown in FIG. 7A, the system 700 includes an input surface 750A and an input station 760. The input surface 750A includes a plurality of directional contact points 755-1, 755-2, 755-3, 755-4, 755-5, and a plurality of functional contact points 755-6, 755-7, 755-8 provided on an upper portion of the input surface 750A and associated with one or more manually activated RFID tags (not shown). The input surface 750A may thus be preferred by left-handed users, in that the directional contact points 755-1, 755-2, 755-3, 755-4, 755-5, are provided on a left side of the input surface 750A and that the functional contact points 755-6, 755-7, 755-8 are provided on a right side of the input surface 750A, thereby enabling a left-handed user to control the position of a pointer on a display using the input surface 750A with his or her strongest or most skillful hand, and to take actions or issue instructions using his or her least strong or skillful hand. The manually activated RFID devices provided in the input surface 750A may be individually programmed to correspond to one or more elements of information or data, or to one or more commands, such that receiving a signal from one or more of the devices causes the input station to execute one or more actions or provide one or more sets of information or data to a computer system or network in accordance with the present disclosure.

Referring to FIG. 7B, the system 700 is shown with an input surface 750B provided on the input station 760. Unlike the input surface 750A of FIG. 7A, which is configured for use by left-handed users, the input station 750B of FIG. 7B is configured for use by right-handed users. As is shown in FIG. 7B, the directional contact points 755-1, 755-2, 755-3, 755-4, 755-5 are provided on a right side of the input surface 750B, while the functional contact points 755-6, 755-7, 755-8 are provided on a left side of the input surface 750B. Thus, a right-handed user may control the location of a pointer on a display using the input surface 750B with his or her strongest or most skillful hand, and to take actions or issue instructions using his or her weakest or least skillful hand.

Accordingly, as is shown with regard to the input surfaces 750A, 750B of FIGS. 7A and 7B, the systems and methods of the present disclosure enable different users of computer systems or networks to enter information, data, commands or instructions to such systems or networks using input surfaces that may be customized according to their personal preferences, traits or characteristics, e.g., the layout or positioning of keys or representations of keys on such surfaces based on whether a user is left-handed, right-handed or ambidextrous. In addition to their respective levels of handedness or ambidexterity, keys or representations of keys may be laid out or positioned based on other personal preferences, traits or characteristics, including height; arm length; finger length, width or diameter; or any other variable or immutable factor regarding or selected by a user.

Figure 8:
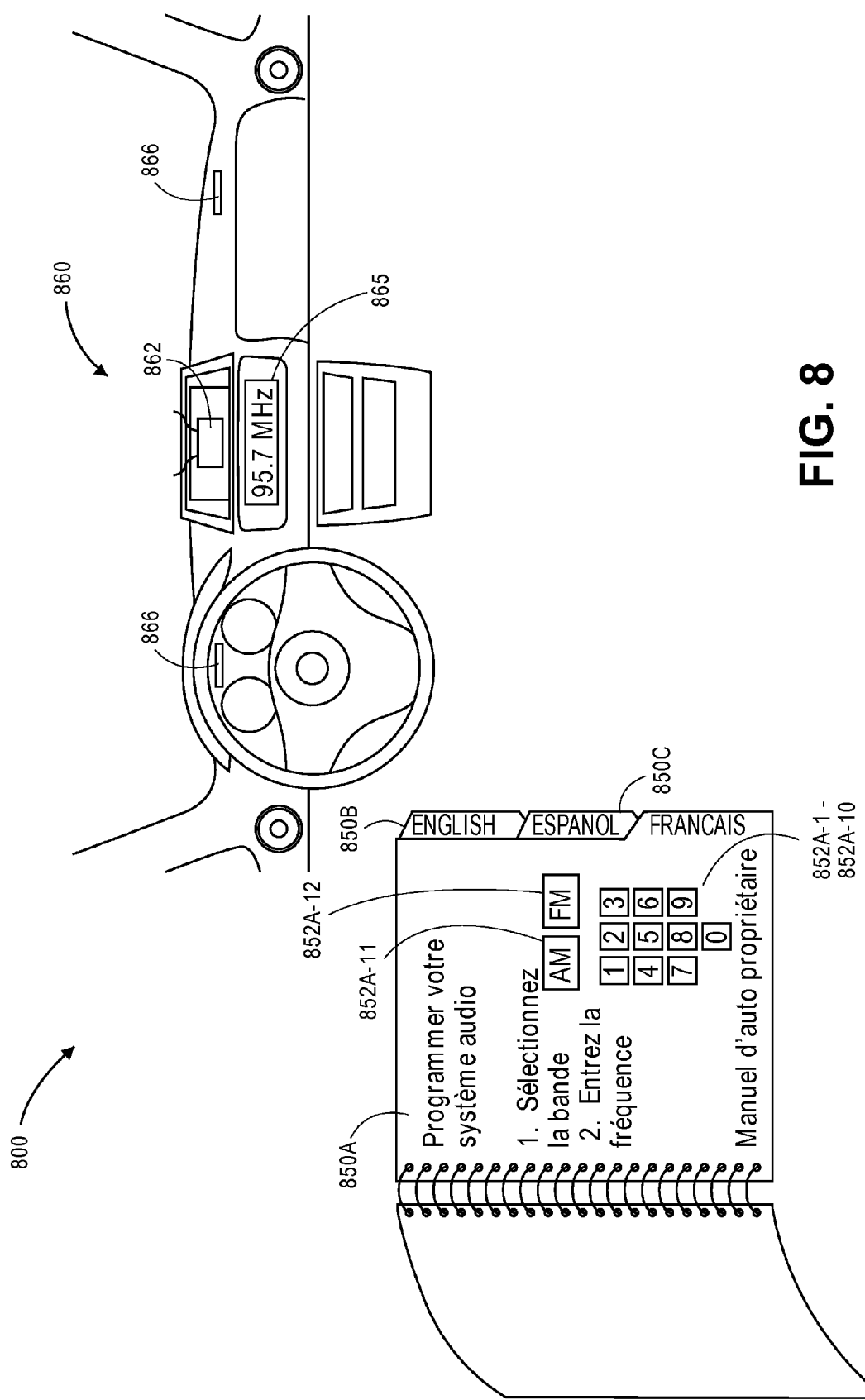
FIG. 8 is a view of components of one system including a dynamic RFID-based input device in accordance with embodiments of the present disclosure.

Additionally, due to the substantially flat and flexible nature of the input surfaces of the present disclosure, a number of surfaces may be provided in a stack or other collection that may be readily perused and accessed by a user, such as the pages of a book or binder including multiple input surfaces. Referring to FIG. 8, a view of components of one system 800 including a dynamic RFID-based input device in accordance with embodiments of the present disclosure is shown. Except where otherwise noted, reference numerals preceded by the number "8" in FIG. 8 indicate components or features that are similar to components or features having reference numerals preceded by the number "7" in FIGS. 7A and 7B, by the number "6" in FIGS. 6A, 6B and 6C, by the number "4" in FIG. 4A, 4B or 4C, by the number "2" in FIG. 2, or by the number "1" in FIGS. 1A through 1D, respectively.

As is shown in FIG. 8, the system 800 includes a book or manual having a plurality of input surfaces 850A, 850B, 850C and an input station 860, viz., an interior of an automobile. The input surface 850A includes information and instructions for programming an audio system that are written in French, while the input surfaces 850B, 850C include instructions for programming the audio system that are written in English and Spanish, respectively. The input surface 850A further includes contact points 852A-1 through 852A-10 that are associated with the numbers 1, 2, 3, 4, 5, 6, 7, 8, 9 and 0, respectively, and are associated with one or more manually activated RFID tags embedded therein (not shown), as well as contact points 852A-11, 852A-12 that are associated with radio frequency bands, viz., AM and PM, respectively. The input station 860 includes an onboard RFID reader 862, a display apparatus 865 indicating a radio frequency and a pair of audio speakers 866.

In accordance with the present disclosure, owners or operators of the automobile may program the audio system thereof using any of the input surfaces 850A, 850B, 850C provided in the manual. Those owners or operators who speak French may select a radio frequency by interacting with one or more of the contact points 852A-1 through 852A-12 from any location within the automobile, e.g., from a driver's seat while the automobile is parked, or from the passenger seat or back seat while the automobile is in operation. Likewise, those owners or operators who speak English or Spanish may turn to the input surfaces 850B, 850C within the manual, and select a radio frequency by interacting with one or more corresponding contact points provided thereon (not shown), also from any location. The systems and methods of the present disclosure may enable users in any computing environment to manipulate one or more computer systems or networks using an input surface in communication with a common input station, based on RFID signals transmitted by one or more manually activated RFID tags provided on the respective pages. Although the manual shown in FIG. 8 includes three input surfaces 850A, 850B, 850C for operating an audio system by French, English and Spanish speaking users within an input station defined by an interior of an automobile, those of ordinary skill in the pertinent art will recognize that input surfaces for performing functions in addition to or other than selecting radio frequencies, and input surfaces for use by speakers of languages of other than French, English or Spanish, and input stations in environments other than automobile interiors, may be provided in accordance with the present disclosure.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as incorporating input surfaces having manually activated RFID tags within a vicinity of input stations having RFID antennas that are provided in a fulfillment center environment, the systems and methods disclosed herein are not so limited, and the input devices disclosed herein, e.g., one or more of the input surfaces or input stations, may be utilized in connection with any computer system, network or application in accordance with the present disclosure.

Furthermore, although some of the embodiments of the present disclosure are shown as including transmitting circuits having particular numbers or combinations of components, the systems and methods of the present disclosure are likewise not limited. Rather, input surfaces having any number of contact points, manually activated RFID tags or automatic RFID tags, and input stations having any number of RFID reading systems or feedback devices, and in any appropriate density, may be incorporated into the systems and methods disclosed herein. The input surfaces and input stations may be from any type or form of structural elements, including but not limited to input surfaces formed of papers, plastics, vinyls, rubbers, woven or non-woven fabrics, or other pliable sheet-like materials, and input stations including desks, tables, easels, podiums or other like features.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 5, the order in which the boxes or steps of the methods or processes are listed is not intended to be construed as a limitation on the claimed inventions, and any number of the boxes or steps can be combined in any order and/or in parallel to implement the methods or processes described herein.

Also, the drawings herein are not drawn to scale, and do not limit, in any way, the number, type or style of structural arrangements of input surfaces or input stations that may be provided in accordance with the present disclosure, or represent any limitations on any aspects of such arrangements, e.g., sizes or shapes of components, or distances or lengths between such components. For example, as is discussed above, the numbers, locations and densities of contact points or RFID devices provided in input surfaces, or the numbers, locations and operating characteristics of RFID antennas provided in input stations, may be chosen, as necessary, in order to ensure that contact with an input surface causes a transmitting circuit to transmit an RFID signal to an RFID reading system of an input station, in accordance with the present disclosure. Furthermore, the drawings herein are intended to describe the structural arrangements and circuits of the present disclosure and the components thereof in a functional manner, and may not accurately reflect paths of current flow or levels of electrical potential between such components of such circuits which would, in any event, be obvious to those of ordinary skill in the pertinent arts.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A workstation comprising:
an input station having a working surface;
an RFID reading system having a plurality of RFID antennas provided on the working surface; and
a computing device having a processor,
wherein the computing device is in communication with the RFID reading system, and
wherein the computing device is configured to at least:
determine that a portable input pad associated with a worker is placed on the working surface, wherein the portable input pad comprises at least one flexible layer and a plurality of manually activated RFID tags, and wherein each of the plurality of manually activated RFID tags comprises a circuit configured to be closed by bioelectricity;
identify the worker associated with the portable input pad;
in response to identifying the worker associated with the portable input pad, configure an application operating on the computing device for the worker;
receive information regarding a plurality of RFID signals transmitted by at least some of the plurality of manually activated RFID tags to at least one of the plurality of RFID antennas, wherein each of the RFID signals is transmitted in response to contact with a portion of the at least one flexible layer associated with one of the manually activated RFID tags by the worker;
identify at least one action associated with the plurality of RFID signals based at least in part on the information regarding at least the plurality of RFID signals; and
cause the at least one action to be executed by the application.

2. The workstation of claim 1, wherein the computing device is further configured to at least:
receive information regarding at least one RFID signal transmitted by an RFID transmitting device associated with the worker to at least one of the plurality of RFID antennas,
wherein the worker is identified based at least in part on the information regarding the at least one RFID signal.

3. The workstation of claim 1, wherein the computing device is further configured to at least:
in response to identifying the worker associated with the portable input pad,
identify at least a preference of the worker; and
wherein the application operating on the computing device is configured for the worker based at least in part on the preference of the worker.

4. The workstation of claim 1, further comprising at least one feedback device,
wherein the computing device is further configured to at least:
provide feedback to the worker in response to at least one of the plurality of RFID signals by the at least one feedback device,
wherein the at least one feedback device comprises at least one of a haptic vibrating element, an audio speaker or an LED light.

5. The workstation of claim 1, wherein the portable input pad comprises a top flexible layer joined to a bottom flexible layer,
wherein the plurality of manually activated RFID tags are disposed between the top flexible layer and the bottom flexible layer,
wherein the top flexible layer comprises a plurality of contact points provided thereon,
wherein each of the plurality of contact points is associated with at least one of the manually activated RFID tags,
wherein each of the contact points is provided above one of the plurality of RFID antennas when the bottom flexible layer is placed on the working surface, and
wherein each of the plurality of RFID signals is transmitted in response to human contact with one of the contact points.

6. A method comprising:
automatically recognizing a first portable input surface associated with a first worker by at least one computer processor, wherein the first portable input surface comprises at least one layer and a plurality of manually activated RFID transmitting devices disposed in association with the at least one layer, and wherein each of the plurality of manually activated RFID transmitting devices comprises a circuit configured to be closed by bioelectricity;

in response to automatically recognizing the first portable input surface associated with the first worker,
selecting one of a plurality of configurations for one of a first input station or a computer application associated with the first input station, wherein the first input station comprises at least one RFID receiving device;

receiving information regarding a first RFID signal transmitted from at least one of the plurality of manually activated RFID transmitting devices of the first portable input surface to the first input station;

interpreting the information regarding the first RFID signal in accordance with the selected configuration by the at least one computer processor;

associating the interpreted information regarding the first RFID signal with at least one of the first worker or the first portable input surface by the at least one computer processor; and storing at least some of the interpreted information regarding the first RFID signal in at least one data store.

7. The method of claim 6, further comprising:
identifying at least one action associated with the first RFID signal by the at least one computer processor based at least in part on the interpreted information regarding the first RFID signal; and
executing the at least one action by the at least one computer processor.

8. The method of claim 6, further comprising:
determining an identity of the first worker by the at least one computer processor.

9. The method of claim 8, wherein determining the identity of the first worker further comprises:
receiving information regarding a second RFID signal transmitted from an automatic RFID device associated with the first worker, wherein the identity of the first worker is determined based at least in part on the second RFID signal,
wherein the one of the plurality of configurations for the one of the first input station or the computer application is selected based at least in part on the first RFID signal and the identity of the first worker.

10. The method of claim 6, wherein selecting the one of the plurality of configurations comprises:
in response to automatically recognizing the first portable input surface associated with the first worker,
determining a preference of the first worker by the at least one computer processor,
wherein the preference is at least one of a handedness or a language of the first worker, and
wherein the one of the plurality of configurations is selected based at least in part on the preference of the first worker.

11. The method of claim 10, further comprising:
automatically recognizing a second portable input surface associated with a second worker by the at least one computer processor, wherein the second portable input surface comprises at least one layer and a plurality of manually activated RFID transmitting devices disposed in association with the at least one layer;
receiving information regarding a second RFID signal transmitted from at least one of the plurality of manually active RFID transmitting devices of the second portable input surface to the first input station;

associating the information regarding the second RFID signal with the at least one of the second worker or the second portable input surface by the at least one computer processor; and determining at least one of an identity of the second worker, a preference of the second worker, a qualification of the second worker or a permission of the second worker by the at least one computer processor, wherein the one of the plurality of configuration is selected based at least in part on the at least one of the identity of the second worker, the preference of the second worker, the qualification of the second worker or the permission of the second worker.

12. The method of claim 11, wherein the at least one of the first portable input surface or the computer application is configured to receive RFID signals from the first portable input surface and the second portable input surface substantially simultaneously in the selected configuration.

13. The method of claim 6, wherein the first portable input surface comprises a top layer and a bottom layer, and
wherein the plurality of manually activated RFID tags are disposed between the top layer and the bottom layer.

14. The method of claim 6, wherein the at least one layer comprises at least one of a paper layer, a plastic layer, a rubber layer or a fabric layer.

15. The method of claim 6, wherein the first input station comprises at least one of:
a first RFID receiving device disposed in a working surface at the first input station; or
a second RFID receiving device mounted above at least a portion of the first input station.

16. The method of claim 6, wherein the first input station comprises at least one feedback device, and
wherein the method further comprises:
generating feedback by the at least one feedback device in response to the first RFID signal.

17. The method of claim 16, wherein the at least one feedback device comprises an audio speaker, a display apparatus, an illuminator or a haptic vibrating element.

18. A method comprising:
receiving, at an RFID reading system provided in association with an input station, a first RFID signal transmitted by an automatic RFID device associated with a first worker;
receiving, at the RFID reading system provided in association with the input station, a second RFID signal transmitted by a manually activated RFID tag provided on at least one flexible layer of a portable input surface, wherein the manually activated RFID tag comprises a circuit configured to be closed by bioelectricity, and wherein the second RFID signal is transmitted by the manually activated RFID tag upon contact with at least a portion of the portable input surface by the first worker;
identifying a confluence of RFID signals comprising the first RFID signal and the second RFID signal;
in response to identifying the confluence of RFID signals, providing feedback to the first worker by at least one feedback device associated with the input station;
selecting a configuration of the computer system for the first worker;
determining at least one action associated with the second RFID signal based on the selected configuration; and
causing, by the at least one computer processor, the computer system to execute the at least one action associated with the second RFID signal.

19. The method of claim 18, wherein the circuit comprises a programmable memory component, and
wherein the method further comprises:
providing information regarding the at least one action to the programmable memory component over a network,
wherein the second RFID signal comprises at least some of the information regarding the action provided to the programmable memory component.

20. The method of claim 18, wherein the at least one feedback device is one of a haptic vibration element, an audio speaker, an LED light or a display apparatus, and
wherein providing the feedback to the first worker by the at least one feedback device comprises:
causing the haptic vibration element to vibrate for a predetermined time;
causing the audio speaker to emit at least one sound;
causing the LED light to illuminate at least the portion of the portable input surface; or
causing information associated with at least one of the first RFID signal or the second RFID signal to be displayed on the display apparatus.

21. The method of claim 6, wherein the first input station comprises a working surface having a plurality of RFID receiving devices disposed in predetermined locations in association with the working surface,
wherein the first RFID signal is transmitted from a first manually activated RFID transmitting device of the portable input surface to a first RFID receiving device disposed in a first location in association with the working surface, and
wherein interpreting the information regarding the first RFID signal in accordance with the selected configuration comprises:
determining a first action associated with the first RFID signal based at least in
part on the selected configuration; and
wherein the method further comprises:
executing the first action by the computer application.

22. The method of claim 6, wherein selecting the one of the plurality of configurations comprises:
determining a language preferred by the first worker; and
wherein the method further comprises:
causing a display of a message on at least one computer display,
wherein the message is displayed in the language preferred by the first worker.

* * * * *